(12) United States Patent
Molin et al.

(10) Patent No.: US 10,489,633 B2
(45) Date of Patent: Nov. 26, 2019

(54) VIEWERS AND RELATED METHODS, SYSTEMS AND CIRCUITS WITH PATCH GALLERY USER INTERFACES

(71) Applicant: Sectra AB, Linköping (SE)

(72) Inventors: Jesper Molin, Linköping (SE); Claes Lundström, Linköping (SE)

(73) Assignee: Sectra AB, Linköping (SE)

( * ) Notice: Subject to any disclaimer, the term of this patent is extended or adjusted under 35 U.S.C. 154(b) by 10 days.

(21) Appl. No.: 15/711,785

(22) Filed: Sep. 21, 2017

(65) Prior Publication Data

US 2018/0089496 A1 Mar. 29, 2018

Related U.S. Application Data

(60) Provisional application No. 62/400,356, filed on Sep. 27, 2016.

(51) Int. Cl.
*G06K 9/00* (2006.01)
*G06K 9/20* (2006.01)
*G06F 3/0482* (2013.01)

(52) U.S. Cl.
CPC ....... *G06K 9/00147* (2013.01); *G06K 9/0014* (2013.01); *G06K 9/2081* (2013.01); *G06F 3/0482* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 6,044,165 A | 3/2000 | Perona et al. | |
| 6,078,307 A | 6/2000 | Daly | |
| 6,721,001 B1 | 4/2004 | Bertis | |
| 7,113,625 B2 | 9/2006 | Watson et al. | |
| 7,571,728 B2 | 8/2009 | Forman et al. | |
| 7,679,620 B2 | 3/2010 | Hoppe et al. | |
| 8,320,620 B1 | 11/2012 | Cohen | |
| 8,388,891 B2 | 3/2013 | Lefebvre | |
| 8,501,435 B2 | 8/2013 | Gustafsson et al. | |
| 8,600,143 B1 | 12/2013 | Kulkarni et al. | |

(Continued)

FOREIGN PATENT DOCUMENTS

WO  WO 2005/096225 A1  10/2005
WO  WO 2010/027430 A2  3/2010

(Continued)

OTHER PUBLICATIONS

Extended European Search Report corresponding to related European Patent Application No. 17192827.8 (9 pages) (dated Apr. 16, 2018).

(Continued)

*Primary Examiner* — Oneal R Mistry
(74) *Attorney, Agent, or Firm* — Myers Bigel, P.A.

(57) ABSTRACT

Methods, systems, workstations, and computer programs with user interactive patch gallery user interfaces that allow a user to alter at least one feature dimension of the patches and/or WSI image using the patch gallery. The patches are different small regions of interest of excerpts of the WSI and are not required to be neighboring excerpts but can be random samples spanning an extent of the feature dimension.

32 Claims, 18 Drawing Sheets
(8 of 18 Drawing Sheet(s) Filed in Color)

(56) References Cited

U.S. PATENT DOCUMENTS

| | | | |
|---|---|---|---|
| 8,645,167 | B2 | 2/2014 | Chirica et al. |
| 9,412,162 | B2 | 8/2016 | Molin et al. |
| 2001/0050999 | A1 | 12/2001 | Bacus et al. |
| 2004/0085443 | A1 | 5/2004 | Kallioniemi et al. |
| 2005/0159759 | A1 | 7/2005 | Harbaugh et al. |
| 2005/0245808 | A1 | 11/2005 | Carson |
| 2006/0159325 | A1 | 7/2006 | Zeineh et al. |
| 2006/0236703 | A1 | 10/2006 | Rada |
| 2007/0118139 | A1 | 5/2007 | Cuellar et al. |
| 2007/0206105 | A1 | 9/2007 | Cooke et al. |
| 2007/0269085 | A1 | 11/2007 | Oshiro et al. |
| 2008/0123910 | A1 | 5/2008 | Zhu |
| 2009/0190821 | A1 | 7/2009 | Marugame |
| 2010/0074508 | A1 | 3/2010 | Shinoda et al. |
| 2010/0093023 | A1 | 4/2010 | Gustafsson et al. |
| 2010/0111396 | A1* | 5/2010 | Boucheron .......... G06K 9/0014 382/133 |
| 2010/0210939 | A1 | 8/2010 | Hartmann et al. |
| 2010/0254588 | A1* | 10/2010 | Cualing ............... G06K 9/0014 382/133 |
| 2010/0260407 | A1 | 10/2010 | Eichhorn et al. |
| 2011/0026803 | A1 | 2/2011 | Can et al. |
| 2011/0040169 | A1 | 2/2011 | Kamen et al. |
| 2011/0060766 | A1 | 3/2011 | Ehlke et al. |
| 2012/0072452 | A1 | 3/2012 | Stratman et al. |
| 2012/0086850 | A1 | 4/2012 | Irani et al. |
| 2012/0320094 | A1 | 12/2012 | Ruddle et al. |
| 2013/0188857 | A1 | 7/2013 | Yoshihara et al. |
| 2014/0233826 | A1 | 8/2014 | Agaian et al. |
| 2014/0301665 | A1 | 10/2014 | Saito et al. |
| 2015/0117730 | A1 | 4/2015 | Takayama |
| 2015/0279032 | A1 | 10/2015 | Hall et al. |
| 2016/0019695 | A1 | 1/2016 | Chukka et al. |
| 2016/0253466 | A1* | 9/2016 | Agaian ................. G06N 3/0427 382/128 |
| 2016/0314580 | A1* | 10/2016 | Lloyd ................... G06K 9/0014 |
| 2017/0076448 | A1* | 3/2017 | Chen ...................... G06T 7/0012 |
| 2017/0323431 | A1* | 11/2017 | Sarkar ..................... G06T 5/003 |
| 2019/0087954 | A1* | 3/2019 | Lloyd ................... G06K 9/0014 |

FOREIGN PATENT DOCUMENTS

| | | |
|---|---|---|
| WO | WO 2010/139697 A1 | 12/2010 |
| WO | WO 2011/158162 A1 | 12/2011 |
| WO | WO 2012/174542 A2 | 12/2012 |
| WO | WO 2014/180747 A1 | 11/2014 |

OTHER PUBLICATIONS

Jones et al. "Scoring diverse cellular morphologies in image-based screens with iterative feedback and machine learning" *Proceedings of the National Academy of Sciences* 106(6):1826-1831 (2009).

Al-Janabi et al. "Whole slide images as a platform for initial diagnostics in histopathology in a medium-sized routine laboratory" *Journal of Clinical Pathology* 65:1107-1111 (2012).

Aleskandarany et al. "MIB1/Ki-67 labelling index can classify grade 2 breast cancer into two clinically distinct subgroups" *Breast Cancer Research & Treatment* 127:591-599 (2011).

Amin et al. "Integration of digital gross pathology images for enterprise-wide access" *Journal of Pathology Informatics* 3(10):1-6 (2012).

Aperio "IHC Nuclear Image Analysis" *User's Guide* (48 pages) (2007).

Bainbridge, Lisanne "Ironies of Automation" *Automatica* 19(6):775-779 (1983).

Bell et al. "The Efficient Operation of the Surgical Pathology Gross Room" *Biotechnic & Histochemistry* 83(2):71-82 (2008).

Bowen et al. "New region feature descriptor-based image registration method" *2012 IEEE International Conference on Systems, Man, and Cybernetics (SMC)* pp. 2489, 2494 (Oct. 14-17, 2012).

Bucher, Jacqueline "Ventana Receives FDA Clearance for Ki-67 (30-9) Image Analysis and Digital Read Applications" *Media Release* http://www.ventana.com/site/page?view=press-release-february28-2012 (1 page) (2012).

Cooper et al. "Digital Pathology: Data-Intensive Frontier in Medical Imaging" *Proceedings of the IEEE* 100(4):991-1003 (2012).

Dekker et al. "MABA-MABA or Abracadabra? Progress on Human-Automation Co-ordination" *Cognition, Technology & Work* 4:240-244 (2002).

Dowsett et al. "Assessment of Ki67 in Breast Cancer: Recommendations from the International Ki67 in Breast Cancer Working Group" *Journal of the National Cancer Institute* 103:1656-1664 (2011).

Elie et al. "A Simple Way of Quantifying Immunostained Cell Nuclei on the Whole Histologic Section" *Cytometry Part A* 56A:37-45 (2003).

Evans et al. "Primary frozen section diagnosis by robotic microscopy and virtual slide telepathology: the University Health Network experience" *Human Pathology* 40:1070-1081 (2009).

Forlines et al. "Improving Visual Search with Image Segmentation" *CHI 2009—Visualization 1* (pp. 1093-1102) (2009).

Gundersen et al. The efficiency of systematic sampling in stereology and its prediction *Journal of Microscopy* 147(3):229-263 (1987).

Honma et al. "Ki-67 evaluation at the hottest spot predicts clinical outcome of patients with hormone receptor-positive/HER2-negative breast cancer treated with adjuvant tamoxifen monotherapy" *Breast Cancer* 22:1-8 (2013).

Irshad et al. "Methods for Nuclei Detection, Segmentation, and Classification in Digital Histopathology: A Review—Current Status and Future Potential" *IEEE Reviews in Biomedical Engineering* 7:97-114 (2014).

Jönsson et al. "Intuitive Exploration of Volumetric Data Using Dynamic Galleries" *IEEE Transactions on Visualization and Computer Graphics* 22(1):896-905 (2016).

Kain et al. "The Chick Embryo as an Expanding Experimental Model for Cancer and Cardiovascular Research" *Developmental Dynamics* 243:216-228 (2013).

Laurinaviciene et al. "Digital immunohistochemistry platform for the staining variation monitoring based on integration of image and statistical analyses with laboratory information system" *Diagnostic Pathology* 9(Suppl 1):S10 (2014).

Laurinavicius et al. "Digital immunohistochemistry: new horizons and practical solutions in breast cancer pathology" *Diagnostic Pathology* 8(Suppl 1):S15 (2013).

Lopez et al. "Clustering Methods Applied in the Detection of Ki67 Hot-Spots in Whole Tumor Slide Images: an Efficient Way to Characterize Heterogeneous Tissue-Based Biomarkers" *Cytometry Part A* 81A:765-775 (2012).

MacroPath D, Digital Imaging System for Grossing, CMI, Blog Archive, Dec. 20, 2013, http://web.archive.org/web/20131220165540/http://choicemedind.com/macropath-d-digital-imaging-system-for-grossing/ (4 pages) (printed from the internet Aug. 24, 2015).

'MacroStation' Brochure 3DHistech (3 pages) (Nov. 21, 2013).

Marks et al. "Design Galleries: A General Approach to Setting Parameters for Computer Graphics and Animation" *Proceedings of the 24th Annual Conference on Computer Graphics and Interactive Techniques* (pp. 389-400) (1997).

Molin et al. "Feature-enhancing zoom to facilitate Ki-67 hot spot detection" *Proceedings of the SPIE* 9041:1-10 (2014).

Molin et al. "Understanding Design for Automated Image Analysis in Digital Pathology" *Proceedings of the 9th Nordic Conference on Human-Computer Interaction* (pp. 1-10) (2016).

Niazi et al. "Entropy based quantification of Ki-67 positive cell images and its evaluation by a reader study" *Proceedings of SPIE* 8676:867601-1-867601-9 (2013).

Pantanowitz et al. "Experience with multimodality telepathology at the University of Pittsburgh Medical Center" *Journal of Pathology Informatics* 3(45):1-9 (2012).

Polley et al. "An International Ki67 Reproducibility Study" *Journal of the National Cancer Institute* 105:1897-1906 (2013).

Pretorius et al. "Visualization of Parameter Space for Image Analysis" *IEEE Transactions on Visualization and Computer Graphics* 17(12):2402-2411 (2011).

(56) References Cited

OTHER PUBLICATIONS

Riber-Hansen et al. "Digital image analysis: a review of reproducibility, stability and basic requirements for optimal results" *APMIS* 120:276-289 (2011).
Rojo et al. "Critical Comparison of 31 Commercially Available Digital Slide Systems in Pathology" *International Journal of Surgical Pathology* 14(4):285-305 (2006).
Romero et al. "Ki67 proliferation in core biopsies versus surgical samples—a model for neo-adjuvant breast cancer studies" *BMC Cancer* 11(341):1-12 (2011).
Roullier et al. "Multi-resolution graph-based analysis of histopathological whole slide images: Application to mitotic cell extraction and visualization" *Computerized Medical Imaging and Graphics* 35:603-615 (2011).
Ruifrok et al. "Quantification of Histochemical Staining by Color Deconvolution" *Analytical and Quantitative Cytology and Histology* 23(4):291-299 (2001).
Sellaro et al. "Relationship between magnification and resolution in digital pathology systems" *Journal of Pathology Informatics* 1(21):1-5 (2013).
Silva et al. "Using color in visualization: A survey" *Computers & Graphics* 35:320-333 (2011).
Stathonikos et al. "Going fully digital: Perspective of a Dutch academic pathology lab" *Journal of Pathology Informatics* 1(15):1-7 (2013).
Stephenson et al. "Standards and datasets for reporting cancers: Dataset for neuroendocrine tumours of the gastrointestinal tract including pancreas" *The Royal College of Pathologists* 3$^{rd}$ edition (40 pages) (2012).
Svensk förening for patologi, "KVAST document brösttumörer, utgåva 3.1.2" http://www.svfp.se/node/214 (49 pages) (revision date of May 15, 2013).
Tang et al. "Objective Quantification of the Ki67 Proliferative Index in Neuroendorcrine Tumors of the Gastroenteropancreatic System: A Comparison of Digital Image Analysis With Manual Methods" *The American Journal of Surgical Pathology* 36(12):1761-1770 (2012).
Thorstenson, Sten "Digital Pathology System" *advance healthcare Network for Laboratory* http://laboratory-manager.advanceweb.com/Archives/Article-Archives/Digital-Pathology-System.aspx, date unknown but believed to be prior to the priority date of the present application (2 pages) (printed from the internet Aug. 13, 2014).
Tucker, F. Lee "Imaging-Assisted Large-Format Breast Pathology: Program Rationale and Development in a Nonprofit Health System in the United States" *International Journal of Breast Cancer* 2012:1-16 (2012).
Tuominen et al. "ImmunoRatio: a publicly available web application for quantitative image analysis of estrogen receptor (ER), progesterone receptor (PR), and Ki-67" *Breast Cancer Research* 12(R56):1-12 (2010).
Varga et al. "How Reliable Is Ki-67 Immunohistochemistry in Grade 2 Breast Carcinomas? A QA Study of the Swiss Working Group of Breast- and Gynecopathologists" *PLoS ONE* 7(5):e37379 (2012).
White et al. "Performance of lung nodule computer aided detection software: effect of slice thickness on chest CT" *Medicamundi* 51(2 & 3):40-45 (2007).
Wilbur et al. "Whole-Slide Imaging Digital Pathology as a Platform for Teleconsultation" *Archives of Pathology & Laboratory Medicine* 133:1949-1953 (2009).
Yagi, Yukako "Challenges in Whole Slide Image Based 3D Imaging" *Assistant Professor of Pathology, Harvard Medical School* (69 pages) (2013).
Partial European Search Report corresponding to related European Patent Application No. 17192827.8 (9 pages) (dated Feb. 19, 2018).

\* cited by examiner

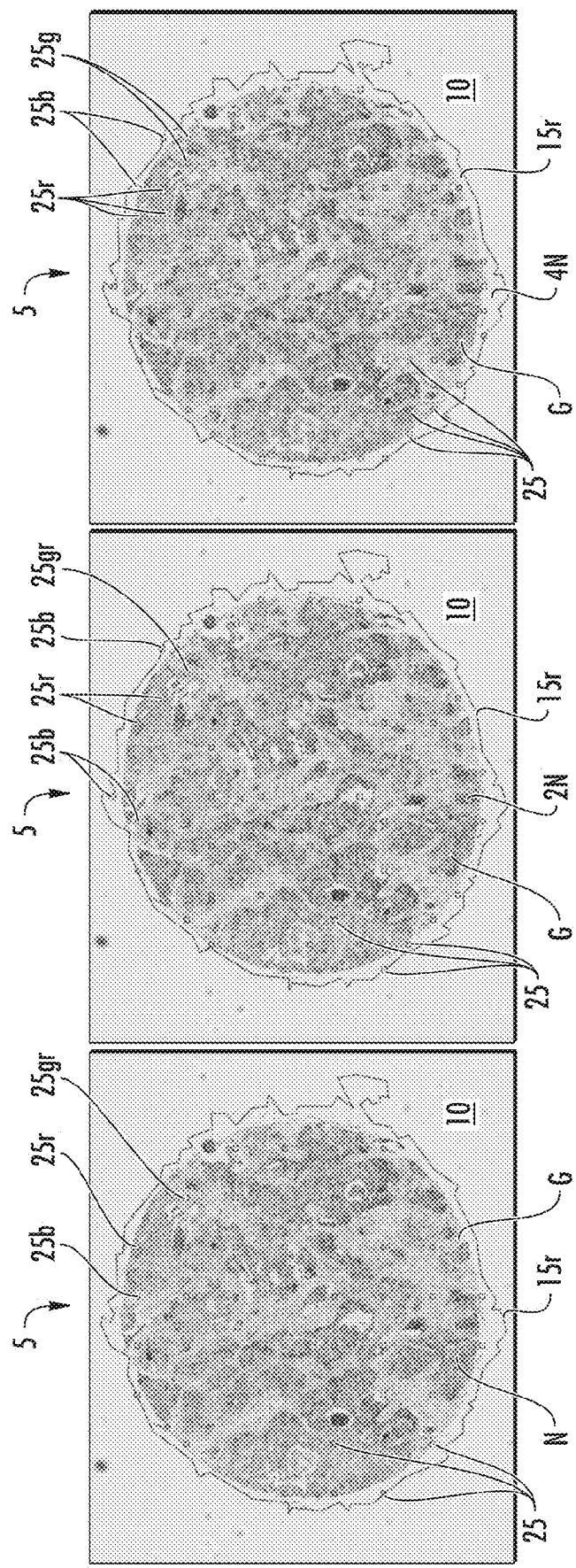

VIEWERS AND RELATED METHODS, SYSTEMS AND CIRCUITS WITH PATCH GALLERY USER INTERFACES

RELATED APPLICATIONS

This application claims the benefit of and priority to U.S. Provisional Application Ser. No. 62/400,356, filed Sep. 27, 2016, the contents of which are hereby incorporated by reference as if recited in full herein.

FIELD OF THE INVENTION

The present invention is particularly suitable for medical microscopy within the digital pathology domain, such as image processing for Whole-Slide Imaging (WSI).

BACKGROUND

A pathologist's analysis of histology images is primarily subjective. Since health care practice is evidence-based, it is crucial to have reproducible methods. The subjective nature of many diagnostic tasks in anatomic pathology and cytology is, however, known to cause reproducibility problems, i.e., high inter- and intra-observer variability in many diagnostic situations. See, Polley et al., An International Ki67 Reproducibility Study. JNCI Journal of the National Cancer Institute 105.24 (2013): 1897-1906. PMC. Web. 24 Nov. 2015.

Today there are many scanners capable of producing high-quality digital images from the microscopy glasses. The resulting images are very large, often 100,000×200,000 pixels. See, e.g., Rojo et al., Critical comparison of 31 commercially available slide systems in pathology, Int J Surg. Pathol., 2006; 14(4):285-305. This digital practice is often called "WSI" or "virtual microscopy" for cytopathology. The resulting digital images can be very large, for instance 30,000×40,000 pixels, 100,000×100,000 pixels or more. In histology, a two-dimensional (2D) image often suffices, but there is also the possibility to produce slices across the depth of the tissue section, creating a three-dimensional (3D) dataset even though the extent in the z direction can be far different from the x-y directions.

A key problem both for manual diagnostic review and automated image analysis is that there are substantial variations in the appearance of the WSI images. Diagnostic decisions are made on the basis of the image appearance, and patient treatment are to a high degree determined by subtle differences such as whether the percentage of positively stained cells are below or above a cut-off level.

One cause for the appearance variation is differences in the laboratory preparation of the glass slide, such as variations in staining (in the chemicals or in the handling) and variations stemming from the scanning. See, Laurinaviciene, Aida et al., Digital Immunohistochemistry Platform for the Staining Variation Monitoring Based on Integration of Image and Statistical Analyses with Laboratory Information System, Diagnostic Pathology 9.Suppl 1 (2014): S10. PMC. Web. 24 Nov. 2015; and Laurinavicius Arvydas et al., Digital immunohistochemistry: new horizons and practical solutions in breast cancer pathology, Diagnostic Pathology 2013, 8(Suppl 1):S15. Despite continuous efforts to address the inherent variations, they still remain a problem.

Between laboratories the differences are often more accentuated which is an increasing problem as modern healthcare often is based on external consultations and this is indeed a primary benefit of introducing a digital diagnostic paradigm in pathology. See, Polley et al., An International Ki67 Reproducibility Study, JNCI Journal of the National Cancer Institute 105.24 (2013): 1897-1906. PMC. Web. 24 Nov. 2015.

Thus, there remains a need for effective tools for the pathologist (the specialized diagnostic physician) to increase consistency and/or produce consistent assessments, despite varying images and subjectivity.

SUMMARY OF EMBODIMENTS OF THE INVENTION

Embodiments of the invention provide viewers, methods and/or image processing circuits that allow user interactions to create visualizations that provide consistent presentation of relevant and information-bearing content of WSI images. Furthermore, these viewers, methods and/or image processing circuits do not require extensive additional work but can be efficiently integrated in a regular reviewing format and/or process.

Embodiments of the invention are directed to methods of processing digital pathology and cytology images for viewing. The methods include: electronically generating a plurality of patches of different sub-regions of a region of interest from a digital pathology or cytology whole slide image (WSI) of a tissue sample; electronically classifying the patches into a plurality of different classes; electronically providing random samples of the patches from each of the different classes; presenting a plurality of the provided patches as a patch gallery on a display; and accepting user input to electronically interface with the patch gallery to perform at least one of: (i) adjust a threshold value of a feature dimension of the patches using an electronic interface input feature on the patch gallery; (ii) reduce a parameter span/extent from the parameter span/extent shown for the patches in the patch gallery which electronically updates the patch gallery displayed to include a more narrow extent of the parameter span/extent; (iii) select or exclude at least one of the patches in the patch gallery to automatically reduce a first positive total cell count by removing cell counts associated with positive cells in the selected or excluded patch; and (iv) select or exclude at least one of the patches in the patch gallery to automatically reclassify the selected patch from its classification in the patch gallery.

The method can also include electronically automatically calculating a compound feature using a defined transformation function of a plurality of different feature dimensions of the patches for the electronic classification and/or sorting The presenting can be carried out so that the patches in the patch gallery are shown on the display in no particular order.

The random samples can be provided based on at least one of a positivity probability and a nucleus probability.

The random samples can be provided based on a positivity probability and a nucleus probability and the sorted order is in an ordinal or numeric scale of the probabilities.

The method can include electronically selecting patches from the generated patches to represent an extent of an ordinal or numeric scale of at least one feature dimension used for the classifying step.

The random selecting of the patches from the classified patches can be carried out to represent an extent of an ordinal or numeric scale of at least one feature dimension.

The electronically classifying the patches can be carried out to classify the patches as either (i) comprising positive nuclei or cell membrane, (ii) comprising negative nuclei or cell membrane, or (iii) comprising non-nuclei or excluded cell membrane.

The at least one panel of the patch gallery can be arranged in a random order from left to right and/or up to down, with decreasing probability values of positivity and/or cell nuclei decreasing to the right and/or down.

The patches are actual region excerpts from the WSI image and the patch gallery arranges the patches with neighboring patches in the gallery not being neighboring actual region excerpts in the WSI image.

The patches in the patch gallery can be regions in the WSI image spanning a defined feature dimension that can be altered by a user interacting with the patch gallery.

The method can include accepting user input to select a patch of interest in the patch gallery, then navigating a larger main or full image view to center the main or full image view to a position closer to the selected patch.

The method can include accepting user input to change a color in a patch which automatically electronically color maps other patches and a main image view of regions corresponding to the updated patches to have the changed color.

The method can include electronically altering a total positive cell count based on the accepting user input.

The at least one of (iii) or (iv) is carried out by allowing the user to select or move a horizontal and/or vertical line drawn about the patches.

The patches can be provided in a random order based on at least one feature dimension in some of the patches. The method can include concurrently displaying a zoomed or normal main digital pathology or cytology image view with the patch gallery. The patches in the patch gallery can be presented in decreasing value from top to bottom and/or left to right on the display.

The obtained WSI image can be a two-dimensional (2-D) WSI having between about $1 \times 10^6$ pixels to about $1 \times 10^{12}$ pixels.

The WSI image can be a three-dimensional (3-D) WSI with a z extent that has a plurality of slices across a depth of a tissue section with less pixels in the z extent relative to x and y extents.

The method can also include one or more of: (a) automatically electronically resorting patches in different classifications based on user input to change the classification of one of the patches from its initial classification, then electronically generating a revised confidence interval of the different classification of the patches; and/or (b) providing an electronic verification mode that allows a user to electronically change a classification of different patches by moving a patch in a patch gallery to another location associated with a different classification; and/or (c) providing an electronic verification mode that allows a user to electronically change a classification of different patches by selecting a user input in a main view showing a high magnification portion of an associated patch under review in the WSI; and/or (d) electronically allowing a user to direct a circuit to add new patches of a complementary space of the region of interest of the WSI to increase a statistical confidence interval of a likelihood of correct identification of positive cell count.

Other embodiments are directed to viewers for evaluating Whole Slide Images (WSI). The viewers include: a display; and a circuit in communication with the display. The circuit includes at least one processor that: generates a plurality of patches of different regions of interest from a digital pathology or cytology whole slide image (WSI) of a tissue sample; classifies the patches into a plurality of different classes; provides random samples of patches of the different classes of samples; presents a plurality of the patches from each of the different classes as a patch gallery on a display; and accepts user input to electronically interface with the patch gallery.

The circuit can be configured to calculate a compound feature using a defined transformation function of a plurality of different feature dimensions of the patches for classifying the patches and/or providing the patches.

The circuit can be configured to have a verification mode that resorts patches into a different classification based on user input to change the classification of one of the patches from its initial classification, and generates a revised confidence interval of the different classification of the patches.

The circuit can be configured to carry out any of the steps/actions or have any of the features of any of the figures including any sub-feature or step therein.

Embodiments of the invention are directed to methods of processing digital pathology and cytology images for viewing, including: electronically generating a plurality of patches of different regions of interest from a digital pathology or cytology whole slide image (WSI) of a tissue sample; electronically classifying the patches into a plurality of different classes; electronically providing and/or selecting random samples of the patches from each of the different classes; and accepting user input to electronically interface with the patch gallery to perform at least one of: (i) adjust a threshold value of a feature dimension of the patches using an electronic interface input feature on the patch gallery; (ii) reduce a parameter span/extent from the parameter span/extent shown for the patches in the patch gallery which electronically updates the patch gallery displayed to include a more narrow extent of the parameter span/extent; (iii) select or exclude at least one of the patches in the patch gallery to automatically reduce a first positive total cell count by removing cell counts associated with positive cells in the selected or excluded patch; and (iv) select or exclude at least one of the patches in the patch gallery to automatically reclassify the selected patch from its classification in the patch gallery.

The method can also include electronically automatically calculating a compound feature using a defined transformation function of a plurality of different feature dimensions of the patches for the electronic classification and/or sorting.

The presenting can be carried out so that the patches in the patch gallery are shown on the display in no particular order.

The provided patches can be generated using criteria of a positivity probability and a nucleus probability and the patches can be generated using an ordinal or numeric scale of the probabilities.

The method can further include electronically selecting patches from the provided patches to represent an extent of an ordinal or numeric scale of at least one feature dimension used for the classifying step.

The classified patches can represent an extent of an ordinal or numeric scale of at least one feature dimension.

The electronically classifying the patches can be carried out to classify the patches as either (i) comprising positive nuclei, (ii) comprising negative nuclei, or (iii) comprising non-nuclei.

The at least one panel of the patch gallery can be arranged in an order from left to right and/or up to down, with decreasing probability values of positivity and/or cell nuclei decreasing to the right and/or down.

The patches can be actual region excerpts from the WSI image, and the patch gallery can arrange the patches in an order with neighboring patches in the gallery not being neighboring actual region excerpts in the WSI image.

The patches in the patch gallery can be of regions in the WSI image spanning a defined feature dimension that can be altered by a user interacting with the patch gallery.

The method can further include accepting user input to select a patch of interest in the patch gallery, then navigating a larger main or full image view to center the main or full image view to a position closer to the selected patch.

The method can further include accepting user input to change a color in a patch which automatically electronically color maps other patches and a main image view of regions corresponding to the updated patches to have the changed color.

The method can further include electronically altering a total positive cell count based on the accepting user input.

At least one of (iii) or (iv) can be carried out by allowing the user to select or move a horizontal and/or vertical line drawn about the patches.

The patches can be presented in an order can be based on at least one feature dimension in some of the patches.

The method can further include concurrently displaying a zoomed or normal main digital pathology or cytology image view with the patch gallery and the patches in the patch gallery can be presented in decreasing value from top to bottom and/or left to right on the display.

The WSI image can be a two-dimensional (2-D) WSI image having between about $1\times10^6$ pixels to about $1\times10^{12}$ pixels.

The WSI image can be a three-dimensional (3-D) WSI image having a z extent with a plurality of slices across a depth of a tissue section with less pixels in the z extent relative to x and y extents.

The method can further include automatically electronically resorting patches in different classifications based on user input to change the classification of one of the patches from its initial classification, then electronically generating a revised confidence interval of the different classification of the patches.

Embodiments of the invention are directed to viewers for evaluating Whole Slide Images (WSI). The viewers include: a display; and a circuit in communication with the display, the circuit including at least one processor that: generates a plurality of patches of different regions of interest from a digital pathology or cytology whole slide image (WSI) of a tissue sample; classifies the patches into a plurality of different classes; provides random samples of patches form the different classes of samples; presents a plurality of the patches from each of the different classes as a patch gallery on a display; and accepts user input to electronically interface with the patch gallery.

The circuit can be configured to calculate a compound feature using a defined transformation function of a plurality of different feature dimensions of the patches for classifying the patches and/or sorting the patches.

The circuit can have a verification mode that resorts patches into a different classification based on user input to change the classification of one of the patches from its initial classification and generates a revised confidence interval of the different classification of the patches.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 16A-16C illustrate grids of patches that increase from an initial number of patches in the grid (FIG. 16A) to arrive at a suitable sample size for a desired calculated confidence interval (either FIG. 16B or FIG. 16C) according to embodiments of the present invention.

DETAILED DESCRIPTION OF EMBODIMENTS OF THE INVENTION

Figure 1:
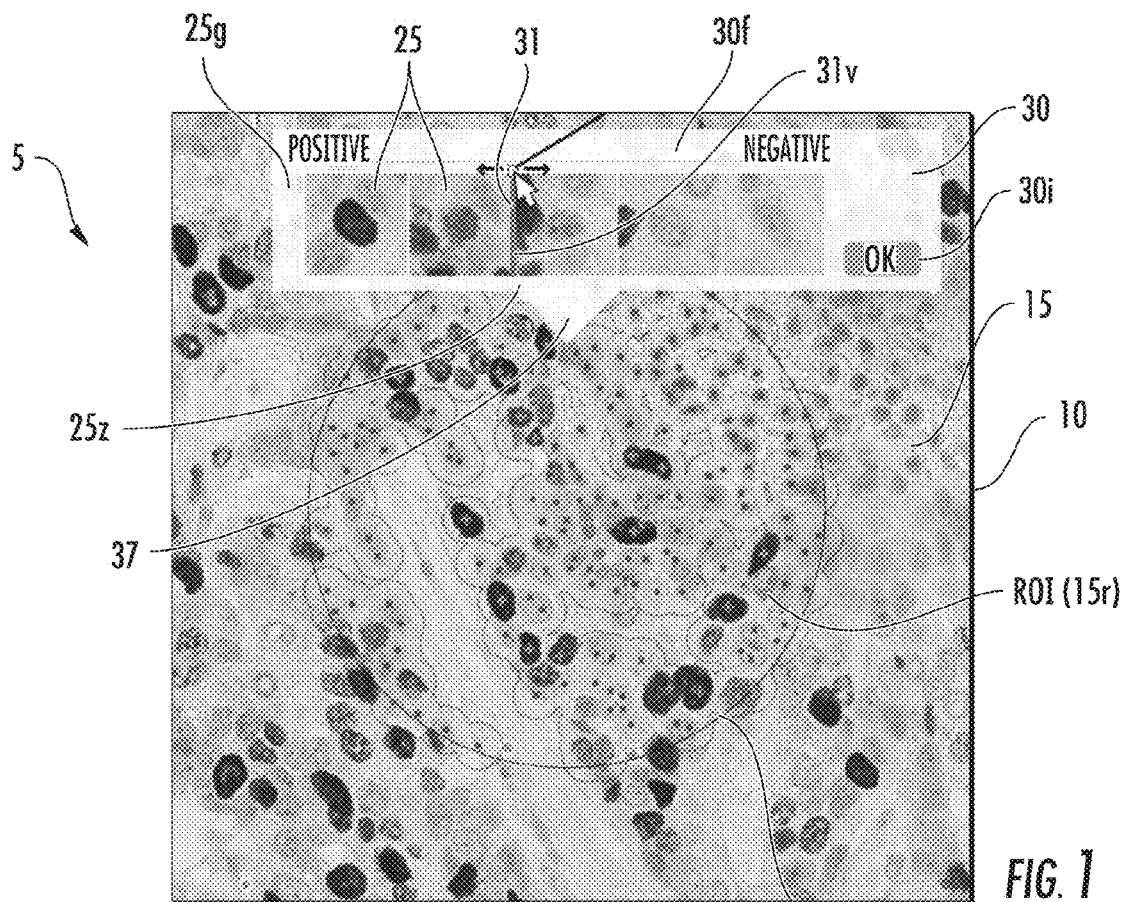
FIGS. 1-3 are examples of displayable views of a user interactive patch gallery with a main image view according to embodiments of the present invention.

The present invention will now be described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. It will be appreciated that although discussed with respect to a certain embodiment, features or operation of one embodiment can apply to others.

In the drawings, the thickness of lines, layers, features, components and/or regions may be exaggerated for clarity and broken lines (such as those shown in circuit or flow diagrams) illustrate optional features or operations, unless specified otherwise. The term "Fig." (whether in all capital letters or not) is used interchangeably with the word "Figure" as an abbreviation thereof in the specification and drawings. In addition, the sequence of operations (or steps) is not limited to the order presented in the claims unless specifically indicated otherwise.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected" or "coupled" to another feature or element, it can be directly connected to the other element or intervening elements may be present. In contrast, when a feature or element is referred to as being "directly connected" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more Application Specific Integrated Circuits (ASICs), for programmatically directing and/or performing certain described actions, operations or method steps. The circuit can reside in one location or multiple locations, it may be integrated into one component or may be distributed, e.g., it may reside entirely in a workstation or single computer, partially in one workstation, cabinet, computer, or server and/or totally in a remote location away from a local display at a workstation. The circuit can communicate with a local display, computer and/or processor, over a LAN, WAN and/or internet to transmit WSI images and/or perform the patch gallery user interaction of a viewer.

The term "automatically" means that the operation can be substantially, and typically entirely, carried out without human or manual input, and is typically programmatically directed and/or carried out. The term "electronically" includes both wireless and wired connections between components. The term "programmatically" means that the operation or step can be directed and/or carried out by a digital signal processor and/or computer program code. Similarly, the term "electronically" means that the step or operation can be carried out in an automated manner using electronic components rather than manually or using merely mental steps.

The term "clinician" refers to a pathologist, physician, oncologist, or other personnel desiring to review medical data of a subject, which is typically a live human or animal patient but forensic uses are also contemplated.

The term "user" refers to a person, or device associated with that person, that uses the noted feature or component, such as a technician, pathologist or other expert, clinician or patient.

The term "about" means that the recited parameter can vary from the noted value, typically by +/−20%.

The term "PACS" refers to PICTURE ARCHIVING AND COMMUNICATION SYSTEM.

The term "magnification" means the image resolution measured in micrometers per pixel, applicable both for the scanned image and the images displayed on screen. Higher magnification corresponds to a lower micrometer per pixel value than lower magnification and vice versa.

The term "high magnification" means displaying an image with an on-screen magnification relatively close to the magnification with which the original image was scanned. Recent (2013) clinical scanning protocols commonly employ 200 times or 400 times magnification, corresponding to 0.5 and 0.25 micrometers per pixel respectively. In this case, "high magnification" corresponds to a magnification range of between about 0.1 micrometers (i.e., microns) to about 1 micron per pixel, more typically between about 0.1 micron to about 0.5 micron per pixel.

The term "low magnification" means displaying an image with an on-screen magnification substantially lower than the magnification with which the original image was scanned. In the case of using a scanning protocol of 0.5 or 0.25 micrometers per pixel, "low magnification" corresponds to magnification range of about 2 micrometers per pixel and above, for example about 10 micrometers per pixel.

The zoom letter "×" indicates a mathematical ("times") multiplier factor associated with a magnification level indicated by the adjacent number, e.g., 0.1×, 1×, 1.25×, 10× and the like, which means that the zoom view is shown at the noted magnification level relative to the original image. Thus, the 1×, 10× and the like descriptors for the digital image refer to the "true optical magnification" of the objective inside the slide scanner. These measures are intended to relate to the visual experience of using the 1×, 10×, etc., objective in a microscope. However, the perceived resolution also depends on other factors: the sensor pixel size, the monitor resolution and the viewing distance. See, e.g., Sellaro et al., Relationship between magnification and resolution in digital pathology systems, J Pathol Inform 2013; 4:21, the contents of which are hereby incorporated by reference as if recited in full herein. The "microns per pixel" definition refers to the digital image itself (not monitor resolution and viewing distance that may vary). To be clear, a certain micron per pixel number is not exactly coupled to a magnification factor such as 10× as the viewers can be used for various different systems and laboratories. However, these magnification levels are used as a short hand herein, e.g., so as to refer to a certain micron value per pixel, so that, for example, 10× is a convenient short hand for a digital image with a resolution of approximately 1 micron per pixel. The magnification level is decoupled from the resolution in which the digital image was acquired, for example, an image acquired at 40× can be displayed at the zoom level of 10×. See, U.S. Pat. No. 9,412,162 for further details of zoom-to-view magnification viewing methods, the contents of which are hereby incorporated by reference as if recited in full herein.

The digital image (WSI) can be of a glass (or other suitable substrate) slide of a tissue sample depicted by a medical microscope. The digital image can be high resolution and have between about $1 \times 10^3 - 1 \times 10^{12}$ pixels and a magnification typically about 0.1-1 micron per pixel, more typically between about 0.1-0.5 micrometers per pixel.

The term "viewer" refers to an electronic interface that allows a user to interact with a display to evaluate tissue samples associated with WSI.

The term "original" image refers to a source digital image from a digital scanner that has not been image processed to alter features for enhancement.

The term "semi-automated" refers to an image processing system, method, module or circuit that employs user (e.g., pathologist) input to adjust a feature dimension of the image to explore image feature variability generated by automated systems.

A patch is associated with at least one measured feature dimension of a patch image of a respective patch. In the example of a nucleus patch, the measured feature dimension can include one or more of: color, opacity, shape, size, contrast, nucleus pattern (in medical terms: chromatin pattern), and nucleus entropy. A patch can also include a gland that is built up by cells, then the relevant features can include roundness, gland orientation, size. In practical applications, the features of the patches can be compound features. These compound features can be 'positivity' or 'negativity', and can use the measured features and combine the measurements of a plurality of detectable features using a statistical and/or mathematical transformation of the data of those detected features. The transformation can be performed by linear or non-linear reduction function(s) that can take a plurality of measured or detected features and create one compound feature. To be clear, a patch is not required to contain a detected object, it can just be an area of tissue for which one or a plurality of features can be measured and/or calculated. Thus, the term "feature dimension" refers to a measurable property of a feature(s) in a patch relevant to user interaction for analysis of the WSI, and can include a parameter for which a threshold can be set or adjusted by a user, a threshold cut off value identifying cells as positive or negative (i.e., cells that have a nucleus that is stained and has a positive expression rather than a neutral or negative expression visually indicated as a defined color is "positive"), a color, opacity, or shape of a feature, size, contrast, nucleus pattern (in medical terms: chromatin pattern), nucleus entropy i.e., cell or nuclei of a cell in a patch. Embodiments of the invention provide visualizations of the patches in a patch gallery using a feature that can be a measured feature and/or a compound feature.

A feature for the measured feature dimension can be identified automatically and electronically. See, e.g., Chapter 1: Introduction, Bishop, C. "Pattern Recognition and Machine Learning (Information Science and Statistics), 1st edn. 2006. corr. 2nd printing edn." (2007), the content of which is hereby incorporated by reference herein.

The term "positivity" and derivatives thereof refers to a probability of a positive association with a clinical disease state such as cancer, for example, that can be identified by a stained color of a nuclei. The typical case is for cancer detection, diagnosis or evaluation, where nuclei relevant for disease assessment have been given a distinct staining, often a brown color.

Generally stated, embodiments of the invention are directed to user interfaces and associated image processing circuits that provide interactive patch galleries on a display (typically of a viewer) that can allow a user to visually evaluate and/or adjust automated views of ROIs and/or total or parts of WSI images to explore variability and/or reliability in automatically generated visualizations/views.

Turning to FIGS. 1-3, 4A, 4B, 5A, 5B, and 6, a viewer 5 with a display 10 presenting a WSI image 15 and patch gallery 25g with a plurality of patches 25 along with a patch gallery user interface 30 is shown.

A relevant Region of Interest (ROI) 15r (associated with the patch gallery 25g) can also be concurrently shown, optionally with an outer perimeter border (typically a closed line) 16 in some views. The outer perimeter border 16 can be circular as shown.

The term "patch" 25 refers to a small region of interest (ROIs) in a respective WSI image 15. The patches 25 are small ROIs of the WSI image 15 and are smaller than and occupy or populate a larger ROI 15r and the larger ROI 15r is a subset of the WSI image 15. Typically, the image processing circuit 10c (FIG. 7) and/or viewer 5 provides the patches 25 as a plurality of adjacent patches in a patch gallery 25g format. The term "gallery" 25g refers to patches 25 that are displayed/arranged as a series of at least one row or at last one column of adjacent patches. In a respective patch gallery 25g, the patches 25 can be associated with different areas in an ROI 15r. The ROI 15r can be many times (10×-100× or more) larger in size than the patches 25 of the WSI image 15.

As shown in FIGS. 4A, 4B, 5A, 5B and 6, the patch galleries 25g can provide the patches 25 in a plurality of rows and columns of adjacent patches.

The patches 25 in a respective patch gallery 25g view can have the same area (height by width dimensions) and each patch 25 can correspond to the same size area of the WSI image. Alternatively, one or more of the patches 25 can have a larger or smaller area in the patch gallery view on the display 10 than one or more others.

The patches 25 can be provided in the patch gallery 25g view in an original and/or non-magnified WSI view or may be at lower or higher magnification relative to their size in an original WSI image.

The patches 25 can be generated and/or sorted and provided in an order in a patch gallery 25g, such as in one or more of a nominal, ordinal, interval or ratio order of one or more feature dimensions (i.e., one or more property of the patches) which may be associated or correlated to estimated clinical relevance in a respective patch gallery. The patches 25 of different classifications can be electronically generated using stratified random sorting and/or patches 25 from different classes can be electronically randomly sorted after the patches 25 are generated and provided in a patch gallery 25g.

Figure 8:
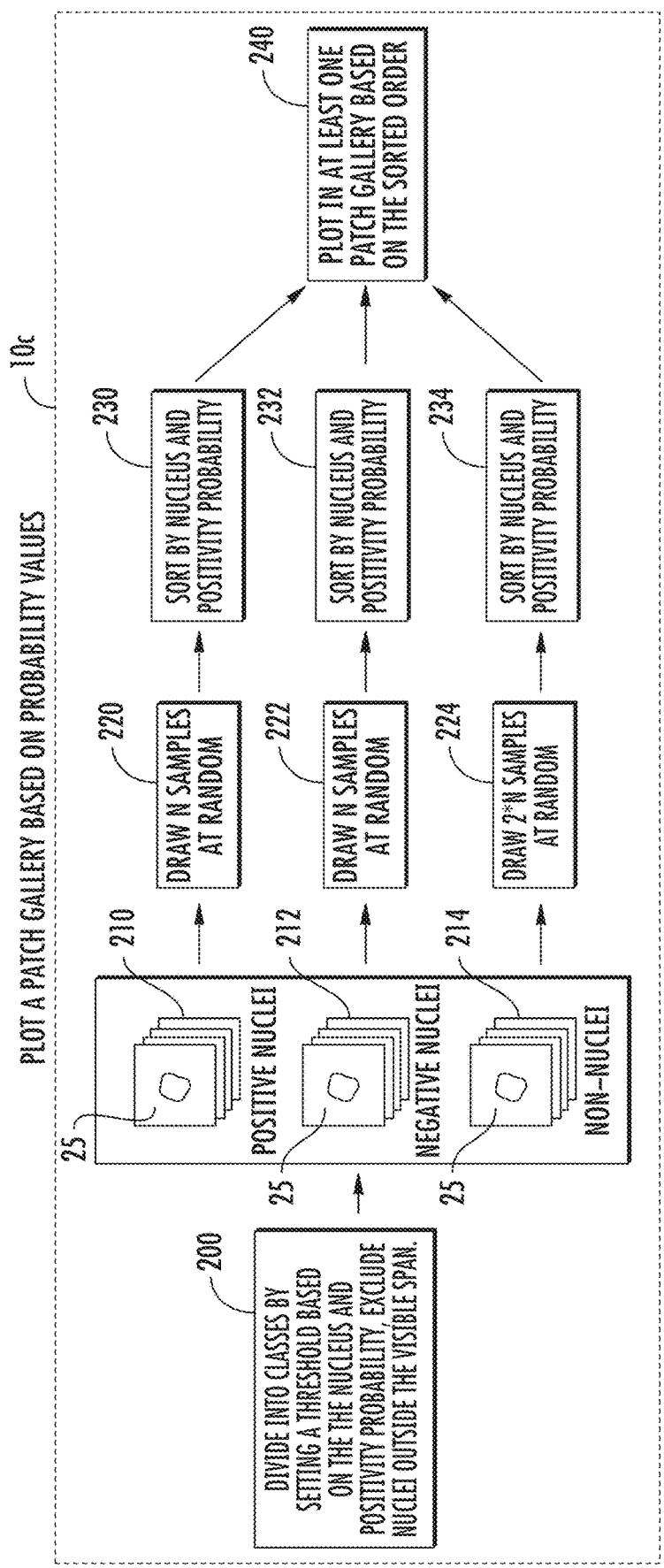
FIG. 8 is a block diagram of an exemplary patch gallery generation method according to embodiments of the present invention.

The patches 25 in a respective patch gallery 25g can be exemplary patches from a target ROI electronically automatically generated and optionally pre-selected and sorted by one or more defined criteria such as using a feature dimension, for example, but are not required to be, and typically are not, physically neighboring areas in the WSI image. For example, as shown in FIG. 8, the circuit 10c can electronically review small areas in a WSI image and generate patches 25. A nucleus patch can represent an area of from 5 microns to 50 microns, whereas a gland patch can represent an area that is from 0.1 mm to 1 mm. This translates to about 20 px to 200 px on a small resolution display and to 40 px to 400 px on a high resolution display for practical applications. The patches 25 can be electronically divided and/or pre-sorted into a plurality of different primary classes based on the presence of a cell nucleus and a positivity probability and may exclude nuclei outside a visible span (block 200). The term "visible span" refers to what is displayed in a main view and may also be referred to as a region of interest. The visible span can involve the whole tumor, which means that the typical span is 5-20 mm, but can also be smaller or larger. If it involves a region of interest of nuclei, then perhaps 0.5-2 mm is more reasonable. In this example, the different classes can include patches 25 with positive nuclei (block 210), patches with negative nuclei (block 212), and patches with non-nuclei (i.e., that do not have nuclei) (block 214). A number N of sample patches 25 of the positive nuclei patches (block 220) and a number N of sample patches of the negative nuclei (block 222) can be selected at random and each sorted by defined common sorting criteria, shown as by nucleus and positivity probability or generated using stratified random sampling. The selection or sort criteria may be the same criteria used to divide the patches into the primary classes (blocks 210, 212, 214). The number of samples N can be the same or different for each of the positive and negative patch classes. The number N is less than all patches for a particular class, and is typically in a range of 10-100. A number (shown as 2*N) of random samples of the non-nuclei patches (block 214) may also be selected (block 224). As shown, the number of random samples of this class of patches can be greater than the number of random samples of the positive and/or negative classes (block 210, bock 212). Again, each randomly selected patch from this class (block 214) can be sorted by the same defined common sorting criteria, shown as by nucleus and positivity probability (block 234). Sorted patches from each of the three different classes can then be presented in at least one patch gallery in a sorted order (block 240) of probability of positivity.

Figure 5A:
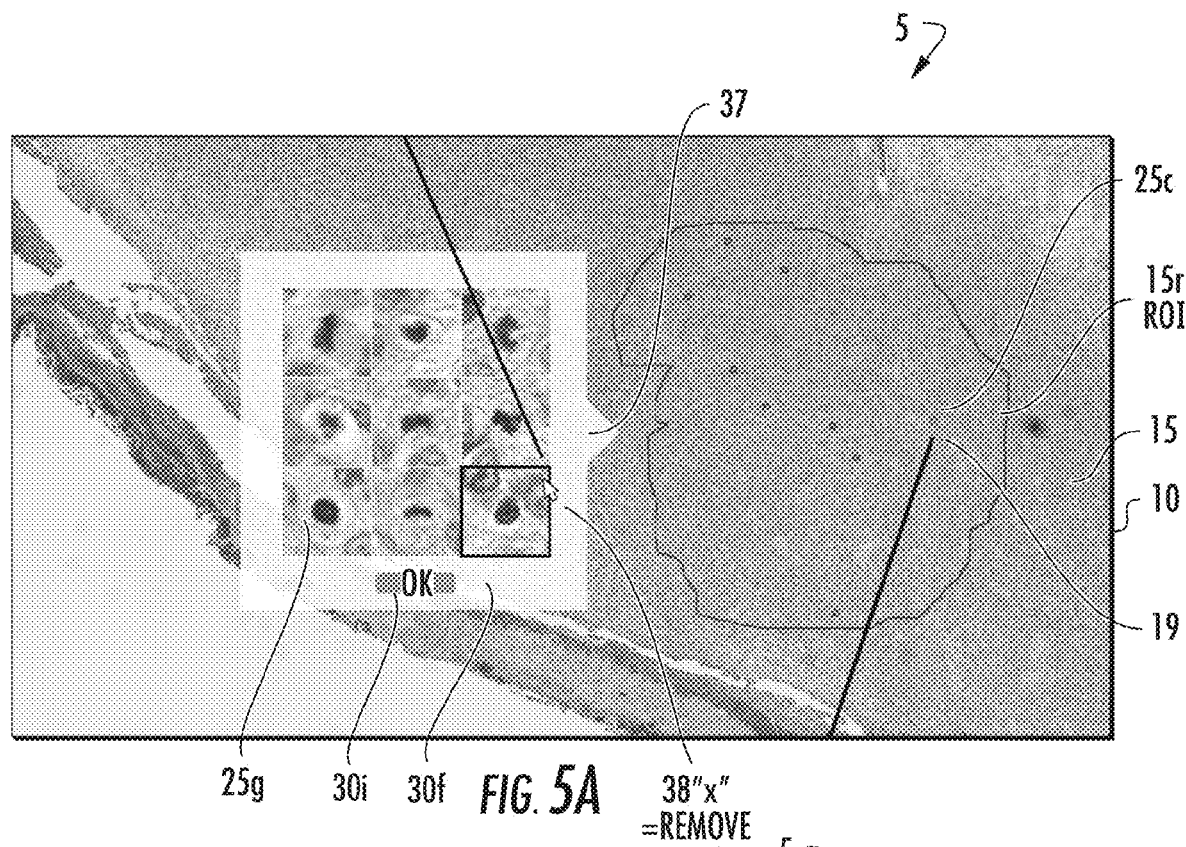
FIGS. 5A and 5B are examples of displayable views of a user interactive patch gallery useful for detecting and evaluating automatically detected mitoses according to embodiments of the present invention.
Figure 5B:
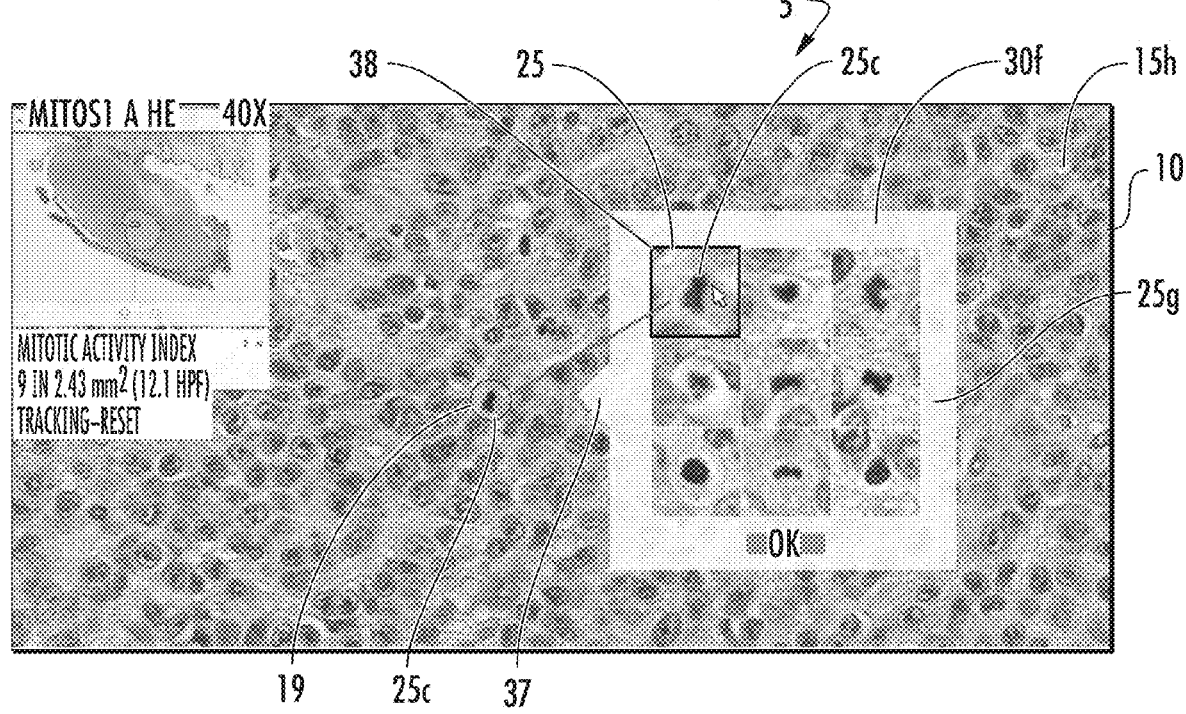

This sorting procedure is representative of a positive count evaluation of cells but other sorting procedures can be used for other evaluations of a patch gallery content, such as mitosis as shown in FIGS. 5A and 5B where there is no particular order but detected mitoses can be shown side by side in the patches displayed to exclude false positives.

Figure 9:
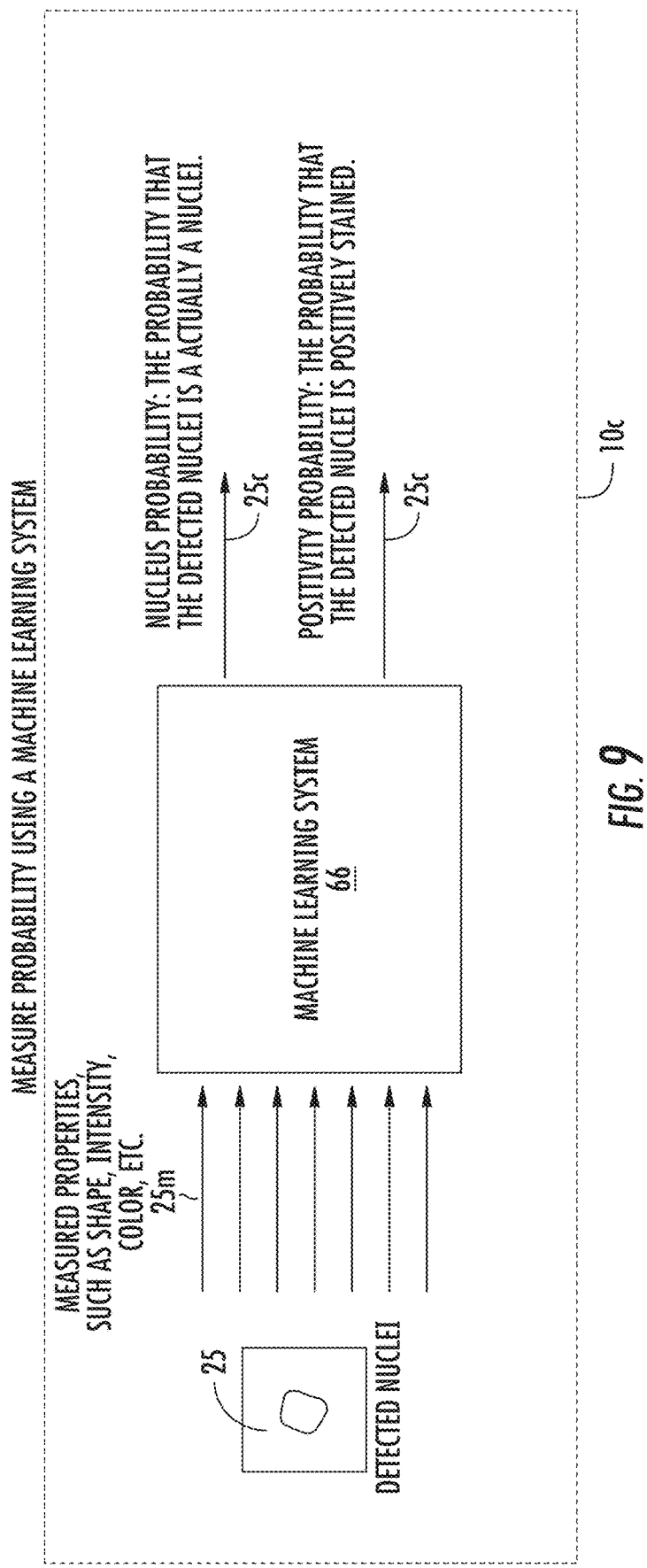
FIG. 9 is a block diagram of a probability generation method for values of patches for a patch gallery according to embodiments of the present invention.

FIG. 9 illustrates that the circuit 10c can calculate probability using a machine learning system 66 that can evaluate measured properties of respective patches 25 input to the machine learning system 66, such as shape, intensity, volume, area, color and the like and output a calculated probability including, for example, a nucleus probability (a probability that the detected nuclei is actually a nuclei) and a positivity probability (a probability that the detected nuclei is positively stained). Machine learning systems are well known to those of skill in the art. See, e.g., H. Irshad et al., *Methods for nuclei detection, segmentation, and classification in histopathology: A review-current status and future potential*, IEEE Rev. Biomed. Eng., vol. 7, pp. 97-114 (2014), the contents of which are hereby incorporated by reference as if recited in full herein. FIG. 9 also illustrates that the input(s) can be measured features 25m and the output can be compound features 25c.

Figure 2:
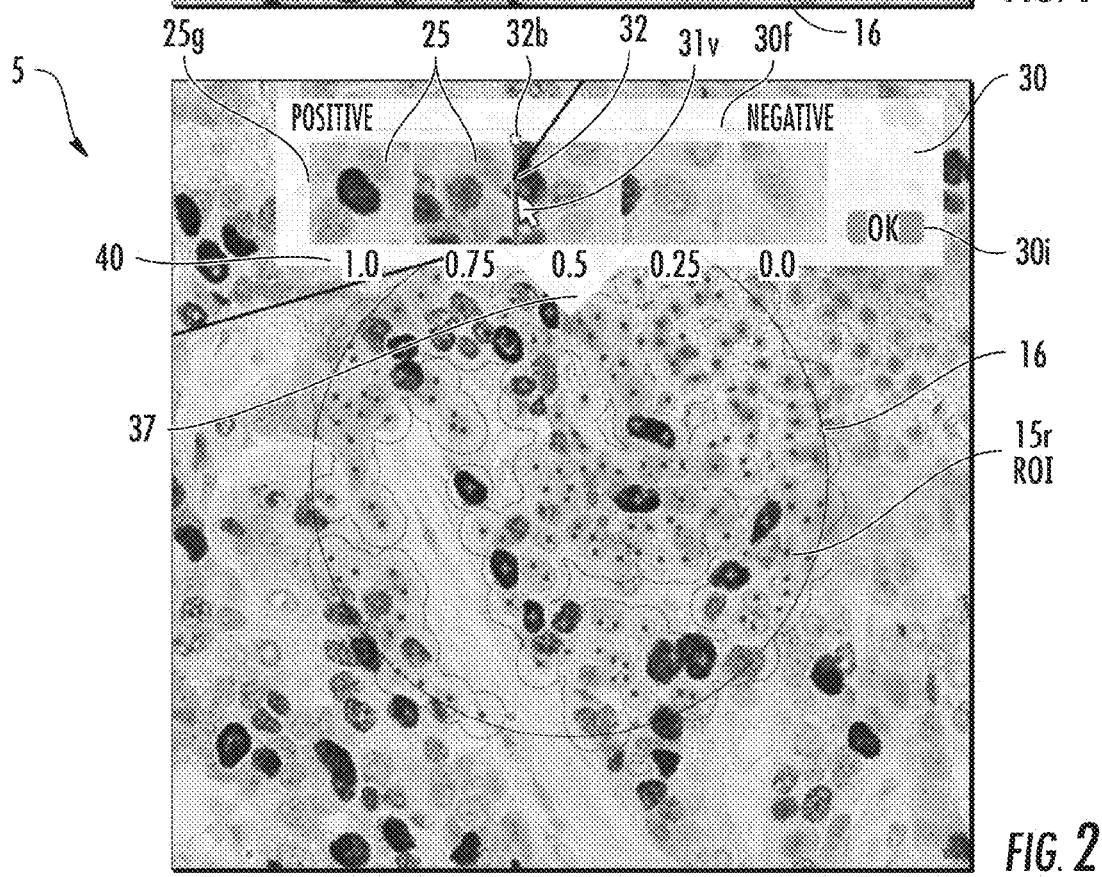
Figure 3:
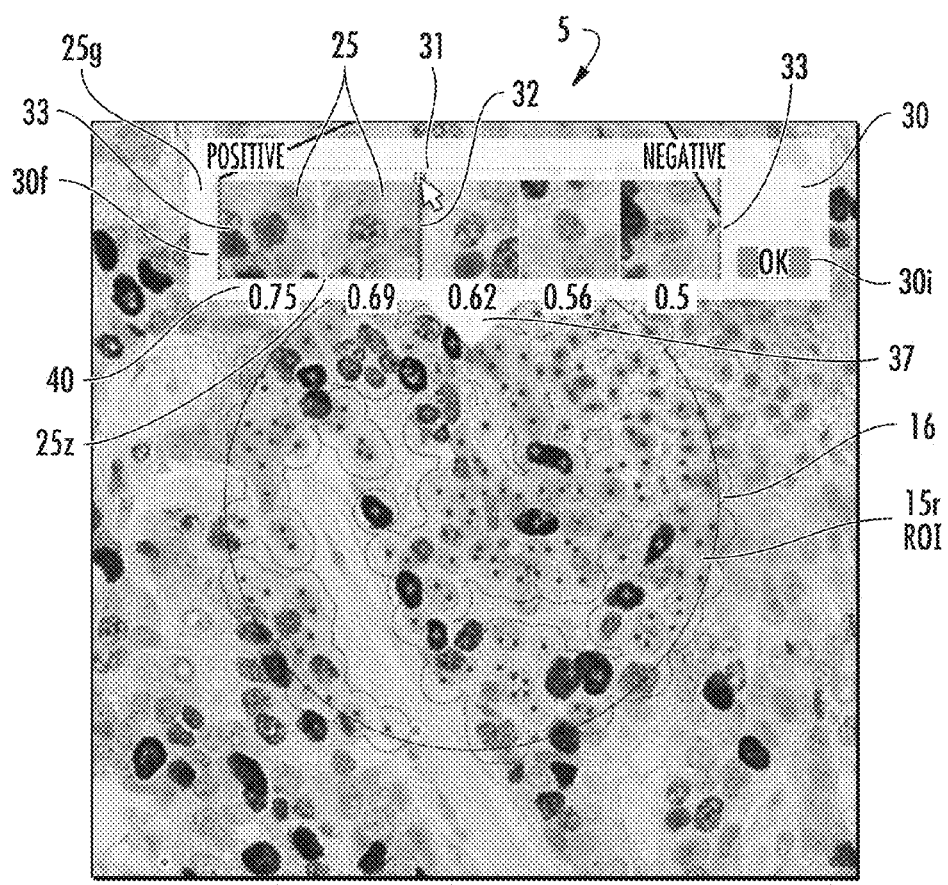

Turning again to FIGS. 1-3, the patch gallery user interface 30 has one or more user interface features that allow a user to interact with the patch gallery 25g. As shown in FIGS. 1-3, an affirmative selection key (shown as an "OK" labeled user input interface) 30i can be used to electronically apply a user selected adjustment for a feature dimension. The adjustment can automatically be applied to other patches and sets of patches associated with the whole image 15 and/or ROI 15r.

The patch gallery 25g can be electronically moved by a user to overlie different areas on the display and/or image 15 and/or ROI 15r. The patch gallery 25g can be presented in a frame 30f and/or can have a visual protrusion or peak 37 pointing to the associated ROI 15r in the image 15 on the display 10. The visual protrusion or peak 37 can automatically be oriented to face the correct direction in different views to reflect where the patches 25 are located in the ROI 15r and/or WSI image 15, even between high magnification to low or original magnification views (see, e.g., FIGS. 1-3, 4A, 4B, 5A, 5B)

The patch gallery 25g can provide separation zones 25z between adjacent patches 25 and a user interface feature 31 which can reside in one or more of the zones 25z. The user interface feature 31 can be electronically selected and/or moved relative to a first position on the display, in the patch gallery user interface 30, to adjust a feature dimension in the patches 25.

As shown in FIG. 1, the user interface input feature 31 can comprise a vertical line, which typically has visually dominant color (a color other than black or white, such as bright or dark red) that can reside in a zone 25z between one pair of neighboring patches 25 that the user can move (i.e., drag using a touch screen, for example) right to left over a different patch or between a different pair of neighboring patches to alter a feature dimension, which is shown as a positive/negative threshold level (positivity level) in FIG. 1.

FIGS. 2 and 3 show the user interface 30 with appended numerical values 40 along one long side thereof. Different patches 25 can have different numerical values in a decreasing or increasing order, shown as in a decreasing order from left to right, the numbers associated with a probability of positive association with a clinical disease state such as cancer. The numerical values 40 can be provided in a range from 1 to 0, 10-0, 100-0, shown as 1, 0.75, 0.5, 0.25, and 0.

FIG. 2 also illustrates that a user interface input feature 32 can be selected by a user by "clicking" or touching between or on a particular patch 25 to then zoom in the parameter image space of the ROI 15r and/or image 15 on the display 10 in response thereto. This user input feature 32 can be combined with the feature dimension adjustment user input feature 31 or may be provided as a separate user interface input feature. In some embodiments, a box 32b above a vertical line is the "zoom" selection input feature 32 and the vertical line 31v is the feature dimension input feature 31.

FIG. 3 illustrates that the numerical range 40 can be electronically adjusted by a user via a user interface input feature 33, shown as vertical broken lines on or adjacent different patches 25, to select end points or patches for ends of a different desired range/extent from that presented in a current view so as to have a smaller or larger extent, shown as a smaller extent in FIG. 3, by compressing the patch gallery or deleting certain end patches to include only patches in a range between 0.5 and 1 (shown as between 0.5 and 0.75). This user interface input feature 33 can be accepted using input 30i to perform fine adjustments to the positivity level in the patches in this patch gallery 25g and in other sets of patches of other patch galleries or patches associated with the ROI 15r and/or image 15.

Figure 4A:
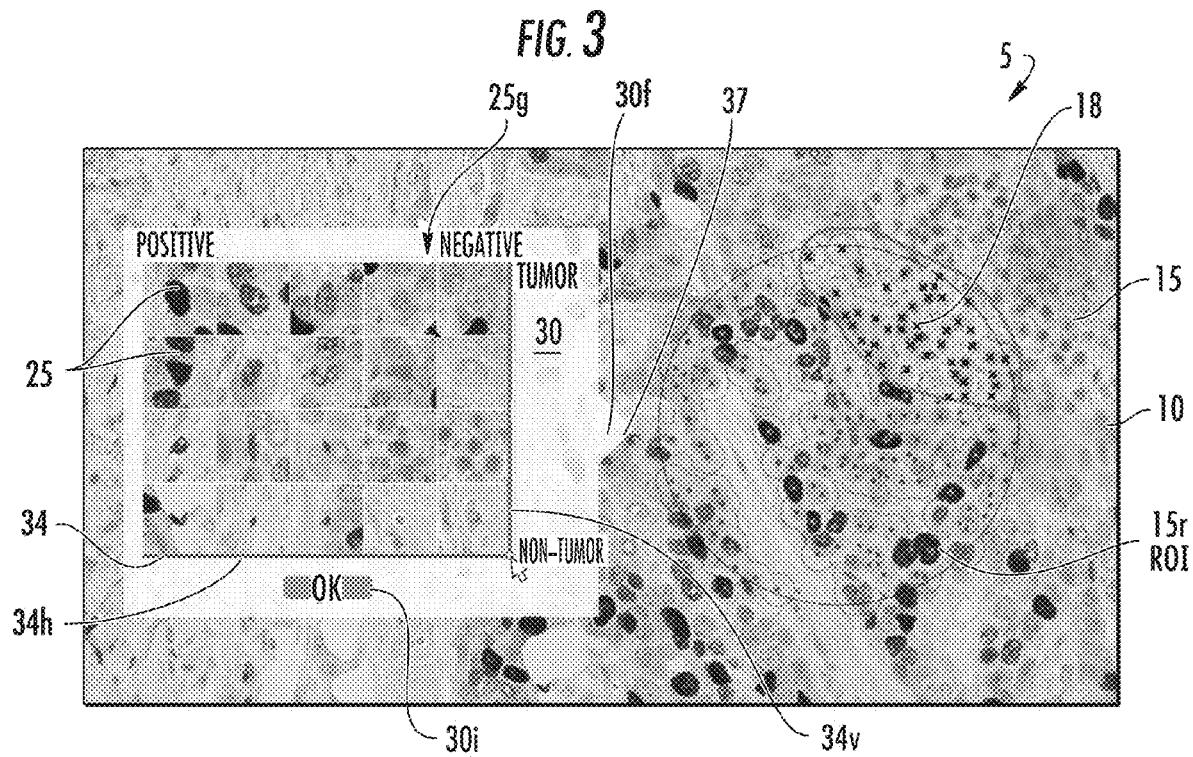
FIGS. 4A and 4B are examples of a displayable views of another embodiment of the user interactive patch gallery with a main image view allowing a user to alter inclusion parameters (compare the patches in FIG. 4A with the altered patch gallery perimeter lines in FIG. 4B) and a count and/or main/normal image view can be electronically updated based on the altered inclusion parameters using the user interactive patch gallery according to embodiments of the present invention.
Figure 4B:
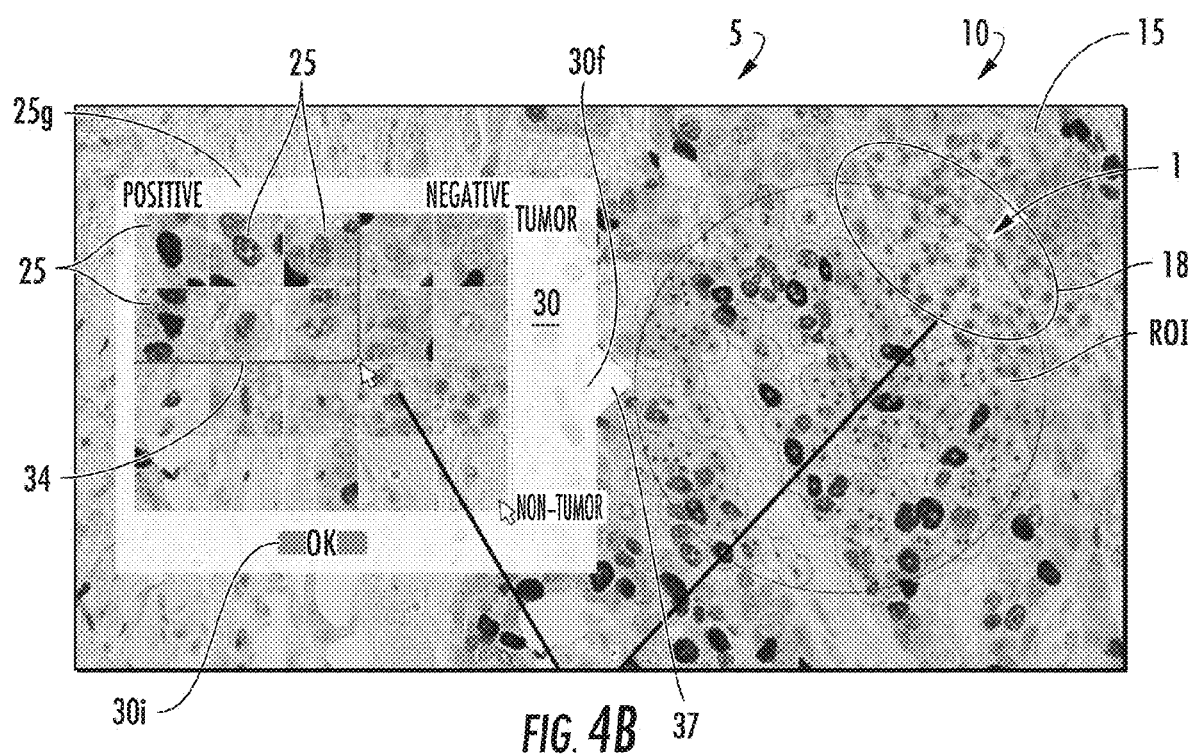

FIGS. 4A and 4B illustrate that the patch gallery 25g can be presented in a grid format of columns and rows in defined order. As shown, the order is from left to right, positive to negative, and top to bottom, tumor to non-tumor probability.

The patch gallery interactive user input 30 can include a user interface input 34 that can adjust the number of patches in a row and/or column (typically both rows and columns) and this input 34 can include a vertical line 34v and a horizontal line 34h that connect to define an outer perimeter in the frame 30f. A user can move the lines 34h, 34v to select a subset of the patches 25 in the gallery 25g. FIG. 4A illustrates that an automated image processing circuit has included too many nuclei as being positive (too many blue cells). Adjustment to move the lines 34 to form a different border in the patch gallery 25g allows a user to adjust the inclusion parameters applied by an automated circuit and can automatically remove the positive count of nuclei in patches associated with/from the sub-segment of the ROI 18 as non-relevant patches 25, which in the gallery 25g, reside closer to the "non-tumor" and "negative" sides of the patch gallery 25g. Compare the "positive" nuclei shown in region 18 of FIG. 4A with "X" spots before the patch gallery adjustment is applied with the corresponding region in FIG. 4B corrected to show the nuclei as non-positive (negative or normal) in FIG. 4B in this region 18. The view and/or count in a normal image view 15 on the display 10 can be updated automatically based on this user adjustment, typically after accepting the adjustment via user interface 30i.

FIGS. 5A and 5B illustrate the use of a patch gallery 25g for detecting and/or evaluating mitoses. The patch gallery 25g provides an overview of the detection and allows a user to use a user interface input 38 to remove any false positives by simply deleting a patch 25 (shown as an X) on a patch.

When a patch 25 is selected, a corresponding cell 25c can be visually enhanced 19 to change in appearance sufficiently to allow a user to readily visually identify the cell (i.e., back lighted, highlighted, increased in color or intensity, changed in color or caused to "blink") in the image view 15.

FIG. 5B shows that a user selection via a user interface input 38 of a patch 25 (top left in this example) of a detected mitosis automatically navigates to the location of the cell 25c of that patch in a high magnification image view 15h so that the cell 25c can be evaluated in its environment. A border and/or other visual enhancement 19 (i.e., backlighting, highlighting, increased in color or intensity, changed in color or caused to "blink") of the cell 25c associated with the selected patch 25 can be displayed in the high magnification view 15h to facilitate the visual correlation.

Figure 6:
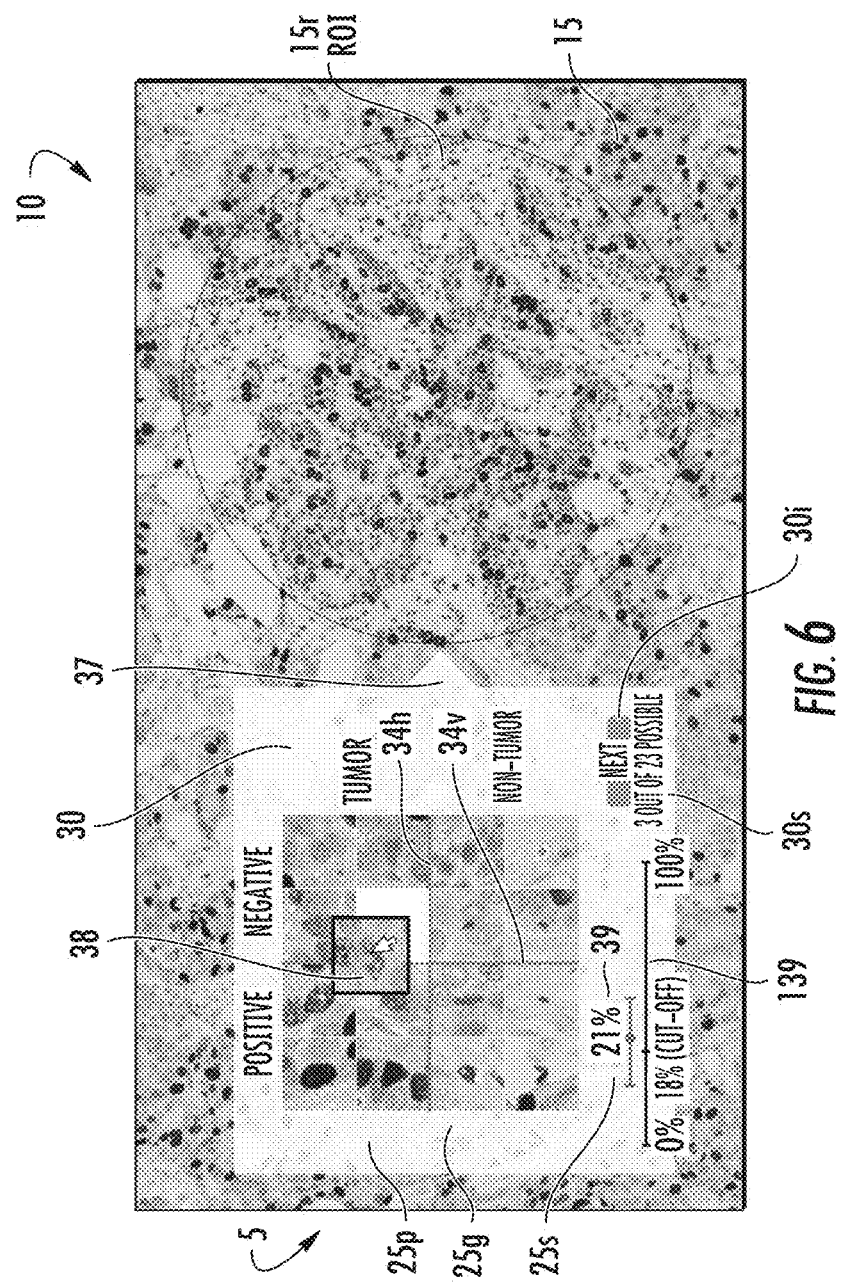
FIG. 6 is an example of a displayable user interactive patch gallery useful for a verification mode according to embodiments of the present invention.

FIG. 6 illustrates that the patch gallery 25g can be used in a verification mode. If the number of nuclei is sufficiently large, it may be very difficult to verify every single one. The patch gallery 25g may be a series of panels 25p of patch galleries, shown as 25s, where the current view is panel 3/23 in the summary text 30s of the gallery user interface 30. In this mode, a user can be presented with (stratified) random samples of counted positive nuclei provided by the different panels 25p of the patch galleries 25g. In stratified random sampling, the patches 25 with counted positive nuclei (strata) are selected based on members' shared attributes or characteristics. A random sample from each stratum is taken in a number proportional to the stratum's size when compared to a population. These subsets of the strata are then pooled to form the random sample, In some embodiments, original or "new" patches 25 for the patch gallery 25g provided to a user via the viewer 5 can be generated using stratified random sampling based on spatial location from a grid pattern. This is a known method called Stereology, e.g. (Gundersen, H J. G., & Jensen, E. B. (1987). *The efficiency of systematic of systematic sampling in stereology and its prediction. Microscopy*, 147(March), 229-263), the contents of which are hereby incorporated by reference as if recited in full herein. This reference also describes how to estimate a confidence interval. Using stereology based sampling, this also means that the patches 25 are not necessarily centered around the nuclei of the cell as in other examples described herein.

A user can review a statistical cut-off value 39 that can be electronically calculated and displayed and provided for each panel or a selected patch 25 on that panel 25p. The cut off value 39 can vary patch to patch 25 and/or panel to panel 25p relative to a total count cut-off 139 for the ROI 15r and/or image 15 of the sample (shown as 18%). The user can adjust the inclusion lines 34v, 34h of patches 25 in individual galleries 25g of the different panels 25p. The user can select a patch 25 via the user interface input 38 with the selected path 25 shown in FIG. 6 as electronically lifted off and moved from its original patch gallery location, and a calculated statistical probability of positive tumor association can be displayed 39.

By electronically sorting each panel 220, 222, 224 of the patch galleries 25g, a confidence level/interval or CI index of a total positive cell count can be electronically calculated. In a clinical scenario, a user can stop the panel reviews when a cut-off decision border is outside a desired or target interval. In a research study or evaluation, a user can stop the individual panel review in the verification mode when the interval is sufficiently small.

The random samples used for the initial sorting are typically samples 220, 222, 224 which make up the initial calculation of a percentage positive and negative nuclei and each time a user corrects the initial calculation, this provides input regarding a potential bias and statistical confidence of the initial classes or sets of patches.

Figure 10A:
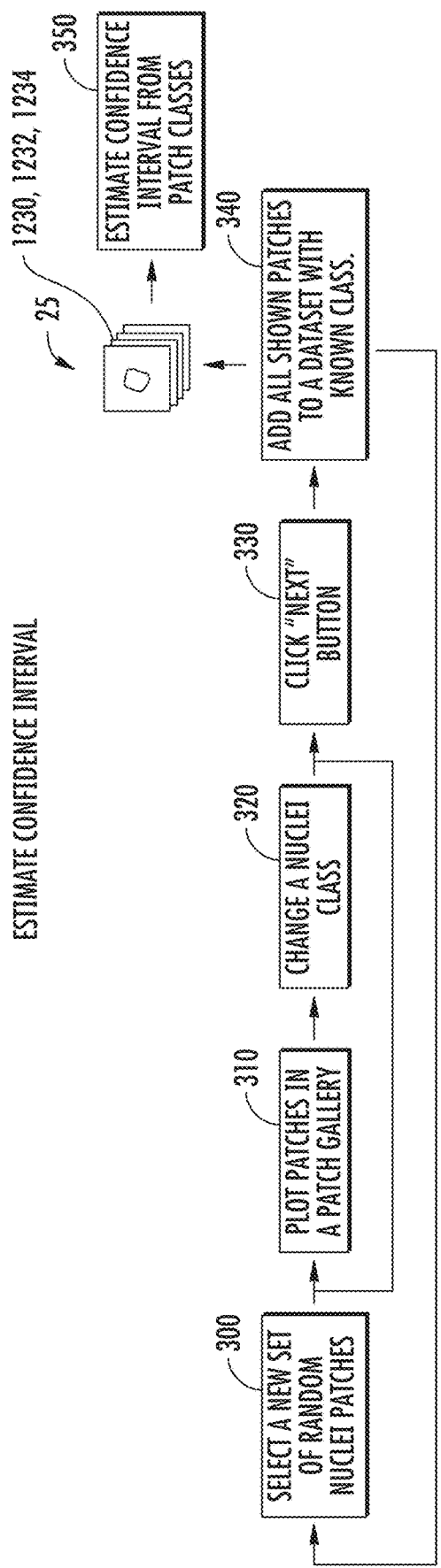
FIG. 10A is a flow chart of exemplary actions/operations that can estimate a confidence level using patch galleries according to embodiments of the present invention.

FIG. 10A illustrates exemplary actions that can be used to electronically estimate a confidence interval based on user sorting such as discussed above, according to some embodiments of the present invention. As shown, a (new/different) set of nuclei patches 25 can be randomly selected (block 300). The patches 25 can be presented in a patch gallery 25g (typically in a sorted order by at least one sort criteria). A nuclei class of one or more patches in the patch gallery shown can be changed (block 320) (i.e., the patch can be changed from a positive nuclei class patch to a negative nuclei class) based on user input during the sorting review in the verification mode, for example. A user can click/enter a "next" input (block 330) and those patches reviewed can be placed in a dataset with a known class (block 340) (resorted sets 1230, 1232, 1234). A statistical confidence interval of proper classification can be electronically estimated from patch classes in the dataset (block 350).

Figure 10B:
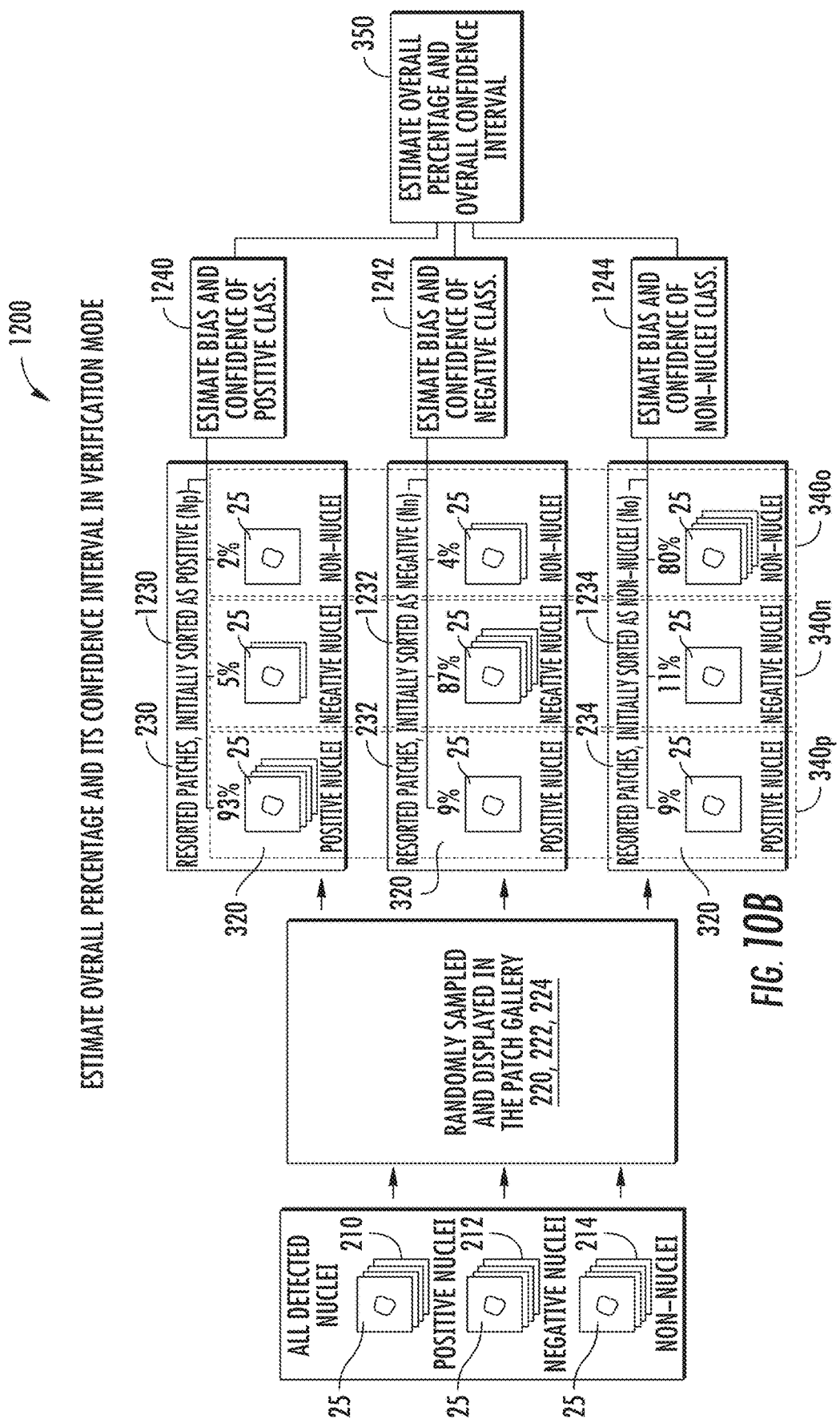
FIG. 10B is another flow chart of exemplary actions/operations that can estimate a confidence level using patch galleries according to embodiments of the present invention.

FIG. 10B illustrates a verification module 1200. As discussed above, patches 25 are evaluated and placed in sets (blocks 210, 212, 214) which are randomly sampled (blocks 220, 222, 224) and displayed in a patch gallery. Each initial sort (blocks 230, 232, 234) can resorted (blocks 1230, 1232, 1234, respectively), so that patches 25 within each set (blocks 230, 232, 234) can be reclassified. The random samples (blocks 220, 222, 224) make up an initial calculation of the percentage of positive nuclei Np, and negative nuclei Np, or non-Nuclei No. Each time a user corrects the initial classification 320, 330 (FIG. 10A) of one of the patches 25 in one of the sets of initially sorted patches, this provides information about a possible bias and confidence of the initial classes, shown as the percentages above the patches 25 in each set of sorted and resorted patches (blocks 1230, 1232, 1234) so that one or more patches change from Np to Nn automatically in the resorted sets and an associated confidence percentage can be calculated based on the resorted patches. Thus, the patch gallery module, typically in the verification mode, can then estimate a bias and/or statistical confidence interval of the resorted (initial) positive class (block 1240), the resorted (initial) negative class (block 1242) and the resorted (initial) non-nuclei class (block 1244).

The resorted positive patches from each set of initial sorted classes can be placed into a dataset with known positive class (block 340p), the resorted negatives can be placed into a dataset with known negative class (block 340n), and the resorted non-nuclei patches can be placed into a dataset with known non-nuclei patches (block 340o). An overall percentage and/or confidence interval can then be calculated using the statistical confidence intervals of each resorted set of patches (block 350).

Figure 7:
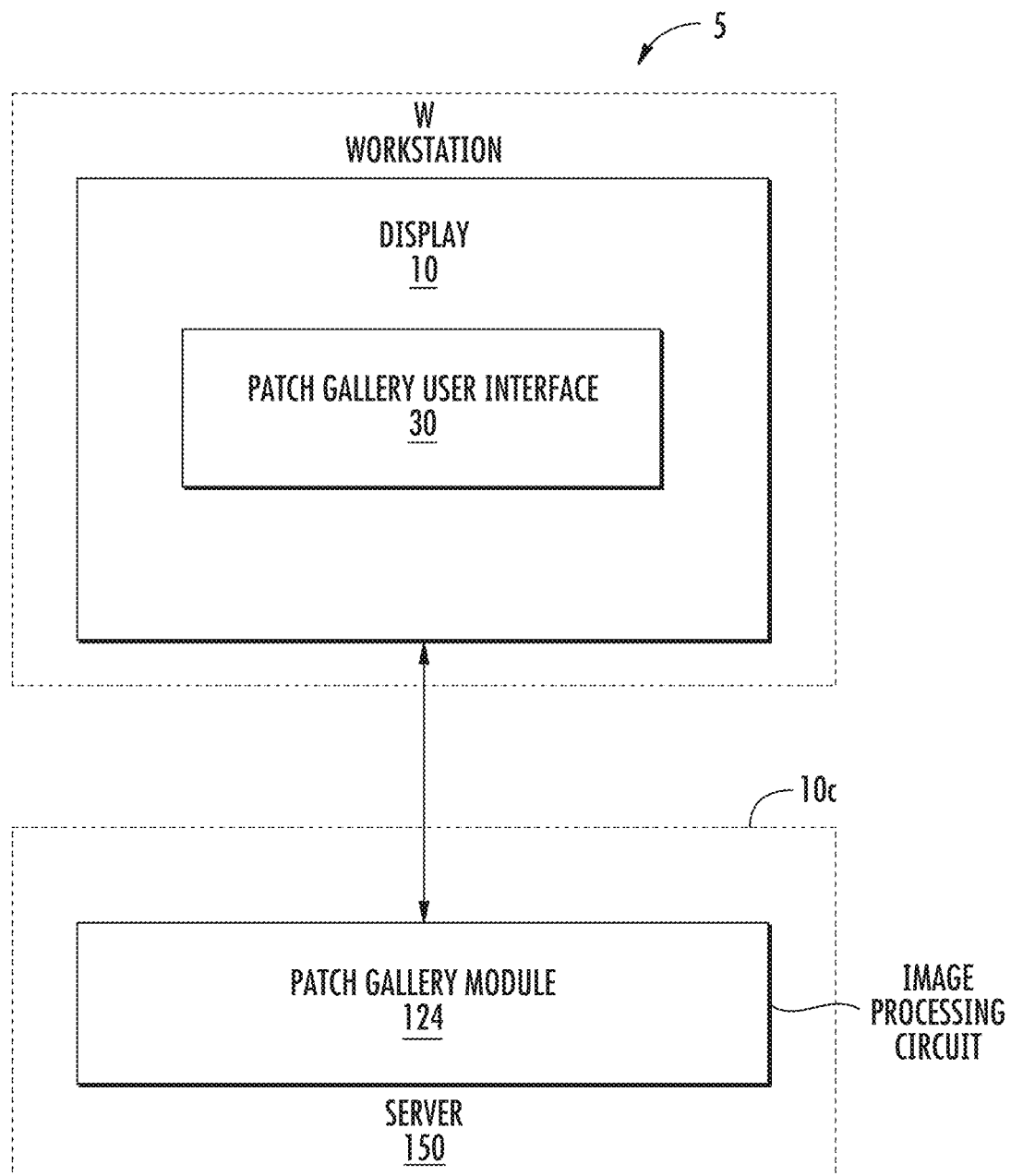
FIG. 7 is a schematic illustration of a viewer and/or image processing system with a circuit and patch gallery module according to embodiments of the present invention.

FIG. 7 is a schematic illustration of a viewer 5 with a display 10 and an image processing circuit 10c with a patch gallery module 124 that can provide the user interactive patch gallery 25g. The image processing circuit 10c can include one or more processors and can be partially or totally held in a workstation with the display 10 or may be partially or totally remote from a workstation, such as held in one or more servers 150 and accessible via the Internet via firewalls. The one or more servers 150 can be integrated into a single server or may be distributed into one or more servers or other circuits or databases at a single physical site or at spatially separate locations. Similarly, the module 124 held by the one or more servers 150 can be distributed into multiple processors or databases or integrated into one.

The server 150 may be embodied as a standalone server or may be contained as part of other computing infrastructures. The server 150 may be embodied as one or more enterprise, application, personal, pervasive and/or embedded computer systems that may be standalone or interconnected by a public and/or private, real and/or virtual, wired and/or wireless network including the Internet, and may include various types of tangible, non-transitory computer-readable media. The server 150 may also communicate with the network via wired or wireless connections, and may include various types of tangible, non-transitory computer-readable media.

The server 150 can be provided using cloud computing which includes the provision of computational resources on demand via a computer network. The resources can be embodied as various infrastructure services (e.g., compute, storage, etc.) as well as applications, databases, file services, email, etc. In the traditional model of computing, both data and software are typically fully contained on the user's computer; in cloud computing, the user's computer may contain little software or data (perhaps an operating system and/or web browser), and may serve as little more than a display terminal for processes occurring on a network of external computers. A cloud computing service (or an aggregation of multiple cloud resources) may be generally referred to as the "Cloud". Cloud storage may include a model of networked computer data storage where data is stored on multiple virtual servers, rather than being hosted on one or more dedicated servers.

Users can communicate with the server 150 via a computer network, such as one or more of local area networks (LAN), wide area networks (WAN) and can include a private intranet and/or the public Internet (also known as the World Wide Web or "the web" or "the Internet." The server 150 can include and/or be in communication with a patch gallery module 124 using appropriate firewalls for HIPPA or other regulatory compliance.

Figure 11:
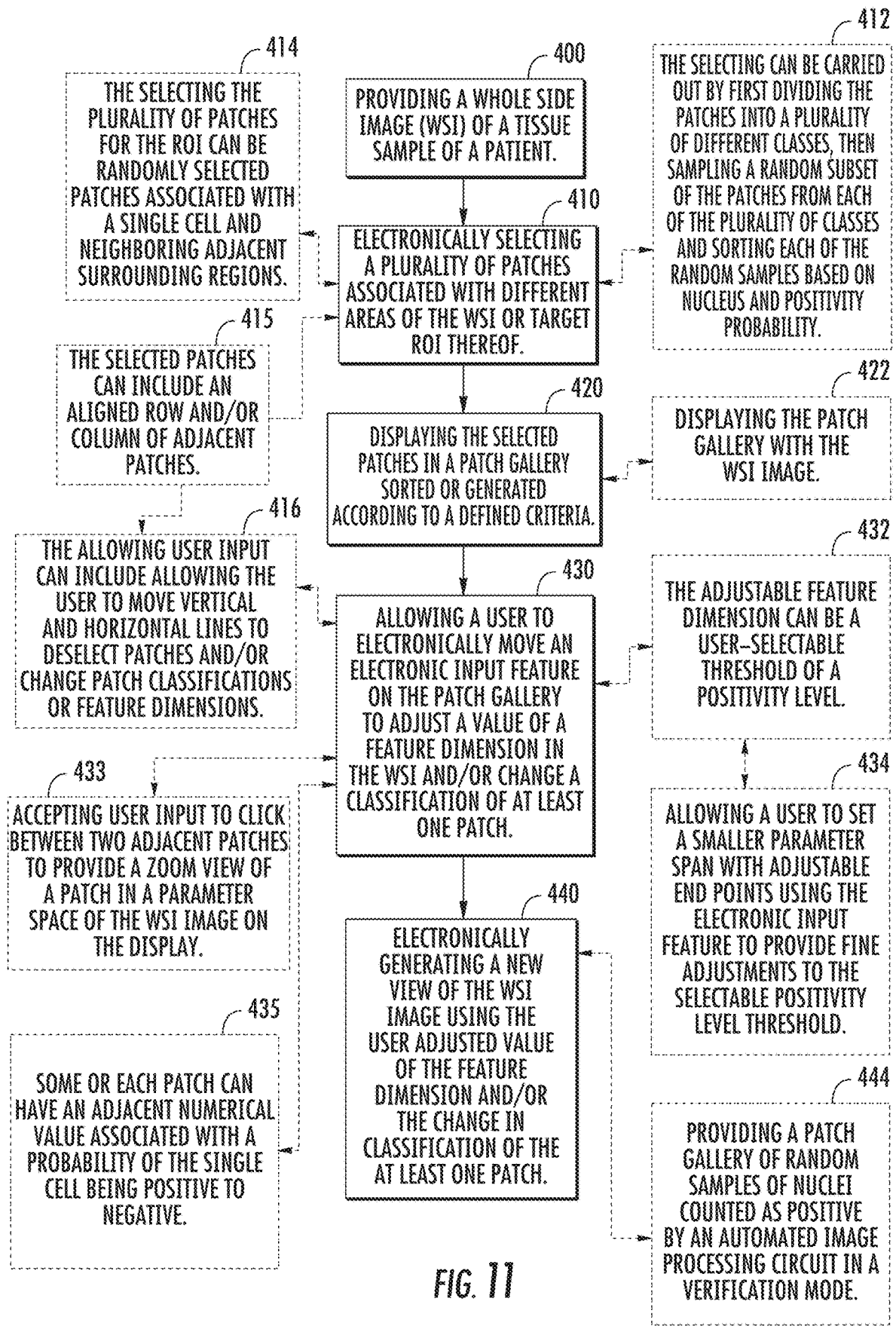
FIG. 11 is a flow chart of exemplary actions/operations that can be used for evaluating images according to embodiments of the present invention.

FIG. 11 illustrates exemplary operations/actions that can be used to carry out embodiments of the invention. A whole slide image (WSI) of a tissue sample of a patient can be provided (block 400). A plurality of patches associated with different areas of the WSI or target ROI thereof is electronically selected (block 410). The selected patches can be displayed in a patch gallery sorted or generated according to defined criteria (block 420). A user can electronically move an electronic input feature on the patch gallery to adjust a value of a feature dimension in the WSI and/or change a classification of at least one patch (block 430). A new view of the WSI image can be generated using the user adjusted value of the feature dimension and/or the change in classification of the at least one patch (block 440).

The selecting can be carried out by first dividing the patches into a plurality of different classes, then sampling a random subset of the patches from each of the plurality of classes and sorting each of the random samples based on nucleus and positivity probability (block 412).

The patch gallery can be displayed with the WSI image (block 422).

The adjustable feature dimension can be a user-selectable threshold of a positivity level (block 432).

A user can set a smaller parameter span with adjustable end points using the electronic input feature to provide fine adjustments to the selectable positivity level threshold (block 434).

A patch gallery of random samples of nuclei counted as positive by an automated image processing circuit in a verification mode can be provided (block 444).

The selecting the plurality of patches for the ROI can be randomly selected patches associated with a single cell and neighboring adjacent surrounding regions (block 414).

The selected patches can include an aligned row and/or column of adjacent patches (block 415).

The allowing user input can include allowing the user to move vertical and horizontal lines to deselect patches and/or change patch classifications or feature dimensions (block 416).

A user can click between two adjacent patches to provide a zoom view of a patch in a parameter space of the WSI image on the display (block 433).

Some or each patch can have an adjacent numerical value associated with a probability of the single cell being positive to negative (block 435).

Figure 12:
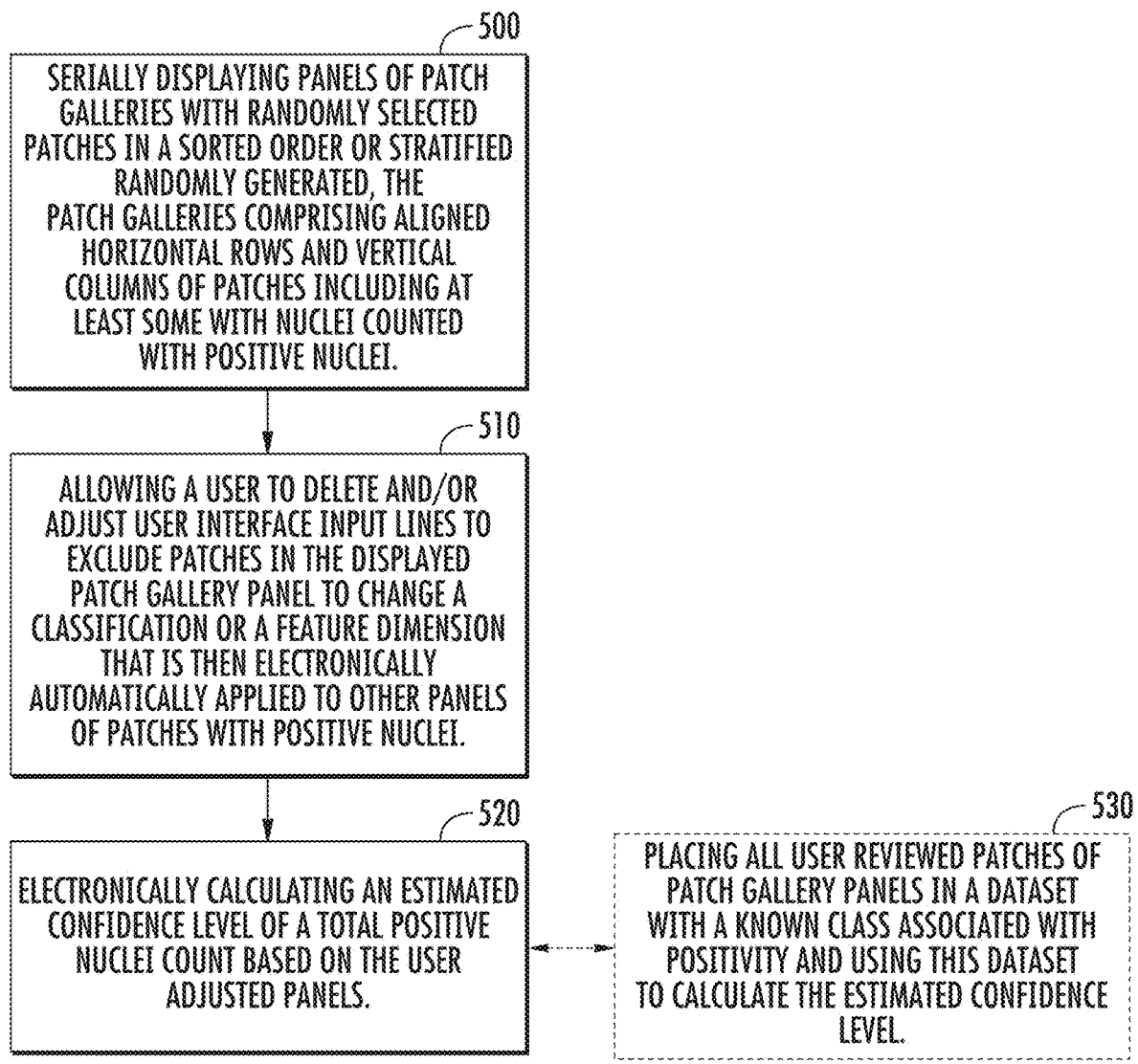
FIG. 12 is a flow chart of exemplary actions/operations that can be used to calculate a confidence level of a total positive nuclei count using patch galleries according to embodiments of the present invention.

FIG. 12 illustrates an exemplary verification mode that can be employed according to embodiments of the present invention. Panels of patch galleries with randomly selected patches in a sorted order or stratified randomly generated patches can be serially displayed and the patch galleries can comprise aligned horizontal rows and vertical columns of patches including at least some with nuclei counted with positive nuclei (block 500). A user can electronically delete and/or adjust user interface input lines to exclude patches in the displayed patch gallery panel to change a classification or a feature dimension that is then electronically automatically applied to other panels of patches with positive nuclei (block 510). An estimated confidence level of a total positive nuclei count can be electronically estimated based on the user adjusted panels (block 520).

All user reviewed patches of patch gallery panels can be electronically placed in a dataset with a known class associated with positivity and this dataset can be used to calculate the estimated confidence level (block 530).

An example viewer task is to use image analysis to quantify the concentration of positive cells in an image or a region of interest of an image, such as a WSI image. To detect cells is typically a straightforward task for an automatic processing algorithm. The algorithms can also typically achieve sufficiently accurate ordering of the detected cells according to probability of being positive. However, a challenge is to set the cut-off threshold positive/negative at the correct point. Due to the variations described above, this is very difficult for a machine to consistently perform. Also, embodiments of the invention allow a user to effectively set and verify a threshold adapted to the particular image at hand.

Apart from a corrective and/or normalizing action allowed using the patch gallery 25 as described above, the patch gallery user interaction can also be used to enhance the WSI images to highlight features (visually enhance features so that a human user can more readily visually see that feature relative to a first visualization appearance) that are informative for particular diagnostic subtasks. In this embodiment, the resulting image may intentionally be represented very differently from how the original glass slide would be seen under a microscope.

The patch gallery 25g is of actual patches from the image being reviewed and the patches can be used to understand the automated visualization or make adjustments to the views/visualizations.

Embodiments of the invention can be applied to a number of scenarios with particular user interaction applications. As described above, a patch gallery is electronically created using a number of representative regions-of-interest (ROI) that are extracted from an image and presented to the user in a gallery format, typically side-by-side with a regular image view. In some embodiments, the patches are selected so that only relevant patches are extracted. For algorithms operating on individual cells, the patches would typically cover a single cell and its immediate surroundings.

As discussed above, a plurality of patches (small regions of interest, such as sub-regions of a larger interest (ROI) image) are extracted from a full WSI image and presented to the user in a list format/patch gallery. The user can then set or select a parameter value for an image analysis or visualization circuit/module/algorithm simply by a position of a patch or a position between patches in the list/gallery. The parameter value can be determined by the properties of an ROI image. The ROI images are selected to represent an extent of the ordinal or numeric scale of the parameter relevant for the review. The patches can be presented in a rank order that can be ordered according to the ordinal or numeric scale of the parameter.

The user-selected parameter value/setting can electronically cause an update in the full image view.

The parameter value can be a cut-off value to split image objects into several categories/classes.

The categorization/classification can place patches with cells as having positive versus negative expression of the stain used. Optionally, the stain is an immunohistochemistry stain.

The classification/categorization can comprise classifying patches based on size and/or shape characteristics of cell nuclei, cells, groups of cell nuclei, or groups of cells in the patches.

The parameter that a user can set using the patch gallery can be a cut-off value that controls boundaries for area segmentation in the larger/main view image.

The parameter can be a control point for a function to map the original image color to a displayed image color.

The user can select a range of currently shown patches, which updates the current patch gallery to cover a selected more narrow extent of the parameter scale.

User input/interaction with the patch gallery can be electronically stored and used as supervision for subsequent algorithm learning.

A user can navigate the full image view by an alternative selecting interaction for the patches, the full image view can then center on the position of a selected patch in the patch gallery within its location in the full/main image view.

Sampling: In case the number of patches exceed what can be effectively overviewed by the user, e.g., more than 20, more than 30, more than 40 or more than 50, a reduced number of patches 25 can be selected and shown in one or more patch galleries 25g. This reduced set of patches 25 can be designed to represent different patch characteristics in a reasonable manner.

Sorting: The patches 25 in the gallery 25g can be generated and/or sorted (ordered) according to criteria which can include one or more feature dimensions relevant for the user interaction, for instance according to the parameter for which a positivity threshold can be adjusted by a user. As discussed above, a user provides input such as by selecting a patch or a level between two patches. For instance, a cut-off threshold for positive/negative cells is set by selecting a level between two patches. The image processing circuit 10c can then electronically adjust to the new, user-based input, typically affecting the entire image and generating an updated display in the regular image view.

Another embodiment of the invention can be used when there are a great number of patches: The user can choose to focus in a more narrow range of the ordered patches. The user would then select a range of the currently shown patches and the gallery is updated to a refined spectrum, giving patch examples only for the range selected.

In some embodiments, any input to the patch gallery by a respective user can be utilized as an explicit statement of the pathologist's knowledge and assessment. Embodiments of the invention can include electronically storing this information and using it for different purposes. For example, the patch-based user adjustment information can be used for effective quality assurance follow-up and consensus creation, by presenting patch selections across many images in aggregated form for scrutiny and/or discussion. Selected patches can also be very valuable as ground truth input to training of machine learning algorithms in image analysis.

In some embodiments, the patch gallery can include a navigation possibility. The patch gallery can be connected to navigation in the main image view. For instance, clicking a patch in a patch gallery can center the main image view on that patch, and key strokes or mouse wheel scroll can allow browsing of the patches with connected re-centering of the main image view.

The patch gallery concept can be applied to a number of application scenarios. For example, setting a threshold parameter for an image analysis algorithm. As mentioned above, a common example is to set a positive/negative cut-off value for cell quantification in immunohistochemistry (IHC) images, such as the Ki-67, ER, PR, PHH3, or HER2 stains. In general terms, setting a cut-off of the parameter "probability of X" is applicable also in many other scenarios: mitosis detection, bacilli detection, fat globule detection etc. In other cases, diagnostic standards define parameters where cut-offs or thresholds need to be established such as degrees of nuclear pleomorphism in breast cancer (Nottingham Histologic Grade). Moreover, all image analysis algorithms operate on internal parameter settings, some of which may be relevant to expose to the user to increase robustness to image variations. Delineation of areas with different degrees of cancer tissue evolution are common image analysis targets, such as Gleason grading in prostate and tumor areas in general, as well as other diagnostically relevant input such as necrosis area.

As discussed above, the patch gallery interaction can allow a user to correct the classification of a patch. Instead of moving a cut-off threshold, the user can explicitly move a patch to a different side of the cut-off threshold. In the case when there are more patches than can fit in the gallery, moving a patch can be electronically applied to the other patches of similar property measurements (even those not shown in the current patch gallery on the display) to change their classification.

Figure 13:
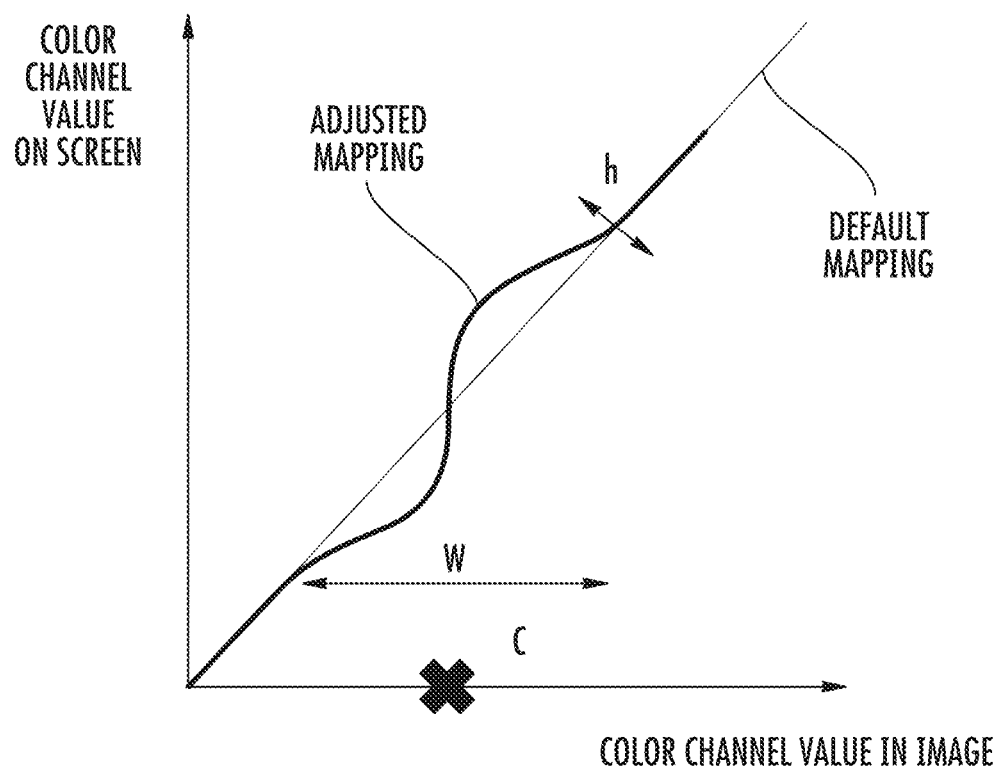
FIG. 13 is a graph of color channel value shown on a display versus color channel value in an image that can be used for color mapping a user selected change in color using a patch gallery according to embodiments of the present invention.

In some embodiments, selecting a control point in a color space can be used for image adjustments. As shown in FIG. 13, a way to compensate for variations in the image production (slide preparation, staining, and scanning) is to digitally change the color mapping for the image shown on display/screen. The color mapping algorithm can be defined by a color space control point (c) along with parameters determining the strength (h) and color space extent (w) of the contrast change, see figure to the right (if assuming RGB color space, the mapping is defined by three such graphs, one for each channel). An intuitive way for the user to control such adjustments is to use the patches to express such changes, for instance to say "more contrast for regions that look like this." Here the user-selected patch in the gallery can define the control point c.

Another type of color mapping can be to use a set of control points in color space. For each control point, the user can set a preferred appearance. For the other parts of the color space, the color can be electronically adjusted accordingly, for instance by a linear interpolation between the control points. A particularly useful variant may be to connect the control points to the actual chemical stains, such as Haematoxylin and Eosin in the most common staining protocol H&E. The user can define two control points by selecting a patch showing full amount of Haematoxylin, the same for Eosin. Then the image adjustment can map those control points to the user's preferred colors (either pre-defined by the user or selected then and there). It may be convenient to use absence of staining (white) as a third control point, to be fixed in the mapping. Thus, the patch gallery 25g can, in this scenario, show a list of candidates for the patch to represent "full Haematoxylin" and "full Eosin," respectively. This procedure can be referred to as a "digital re-staining."

Some embodiments allow a user to electronically mark large amounts of objects/features. It can be useful to study features of the image across an entire slide. A particular case is quantification, for instance counting different cell types and other objects. As the images are enormous, it is extremely time-consuming to go through the image and mark cells and other objects of similar sizes. The patch gallery 25g can then be used to select all objects similar to the patch shown by selecting the patch 25. This feature is expected to work particularly well in combination with the "narrowing range" interaction described in the overall gallery concept. An example is mitosis detection. An automatic evaluation can identify/find candidates for mitotic cells and display representative patches in the gallery 25g. A user can adjust which patches 25 that are to be counted as mitotic cells or not. For borderline patches, a user can drill down into a more narrow range by adjusting threshold parameters or a smaller parameter span/end points (see, FIG. 3) to make more detailed selections.

The module 124 or circuit 10c (FIG. 7) can also include one or more report output devices, including a display 10 (onboard the workstation W or associated with another computer), a printer, a facsimile machine, and pervasive computer devices such as electronic notepads, smartphones, cell phones and the like. A diagnosis based on the analyzed sample using the module 124 can be delivered by email, facsimile, and/or directly to a HIS (Hospital Information System), LIMS (Laboratory Information Management System), PACS systems, or other systems of addresses (electronic or physical).

It is noted that while embodiments of the present invention use a remote server for the patch gallery module, it is contemplated that different clinic sites or each facility or room may have a dedicated on site viewer 5 with an onboard image processing circuit 10c and/or patch gallery module 124.

Embodiments of the present invention may take the form of an entirely software embodiment or an embodiment combining software and hardware aspects, all generally referred to herein as a "circuit" or "module." Furthermore, the present invention may take the form of a computer program product on a (non-transient) computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices. Some circuits, modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller. Embodiments of the present invention are not limited to a particular programming language.

Computer program code for carrying out operations of data processing systems, method steps or actions, modules or circuits (or portions thereof) discussed herein may be written in a high-level programming language, such as Python, Java, AJAX (Asynchronous JavaScript), C, and/or C++, for development convenience. In addition, computer program code for carrying out operations of exemplary embodiments may also be written in other programming languages, such as, but not limited to, interpreted languages. Some modules or routines may be written in assembly language or even micro-code to enhance performance and/or memory usage. However, embodiments are not limited to a particular programming language. As noted above, the functionality of any or all of the program modules may also be implemented using discrete hardware components, one or more application specific integrated circuits (ASICs), or a programmed digital signal processor or microcontroller. The program code may execute entirely on one (e.g., a workstation) computer, partly on one computer, as a stand-alone software package, partly on the workstation's computer and partly on another computer, local and/or remote or entirely on the other local or remote computer. In the latter scenario, the other local or remote computer may be connected to the user's computer through a local area network (LAN) or a wide area network (WAN), or the connection may be made to an external computer (for example, through the Internet using an Internet Service Provider).

The present invention is described in part with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing some or all of the functions/acts specified in the flowchart and/or block diagram block or blocks.

The flowcharts and block diagrams of certain of the figures herein illustrate exemplary architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order or two or more blocks may be combined, depending upon the functionality involved.

Figure 14:
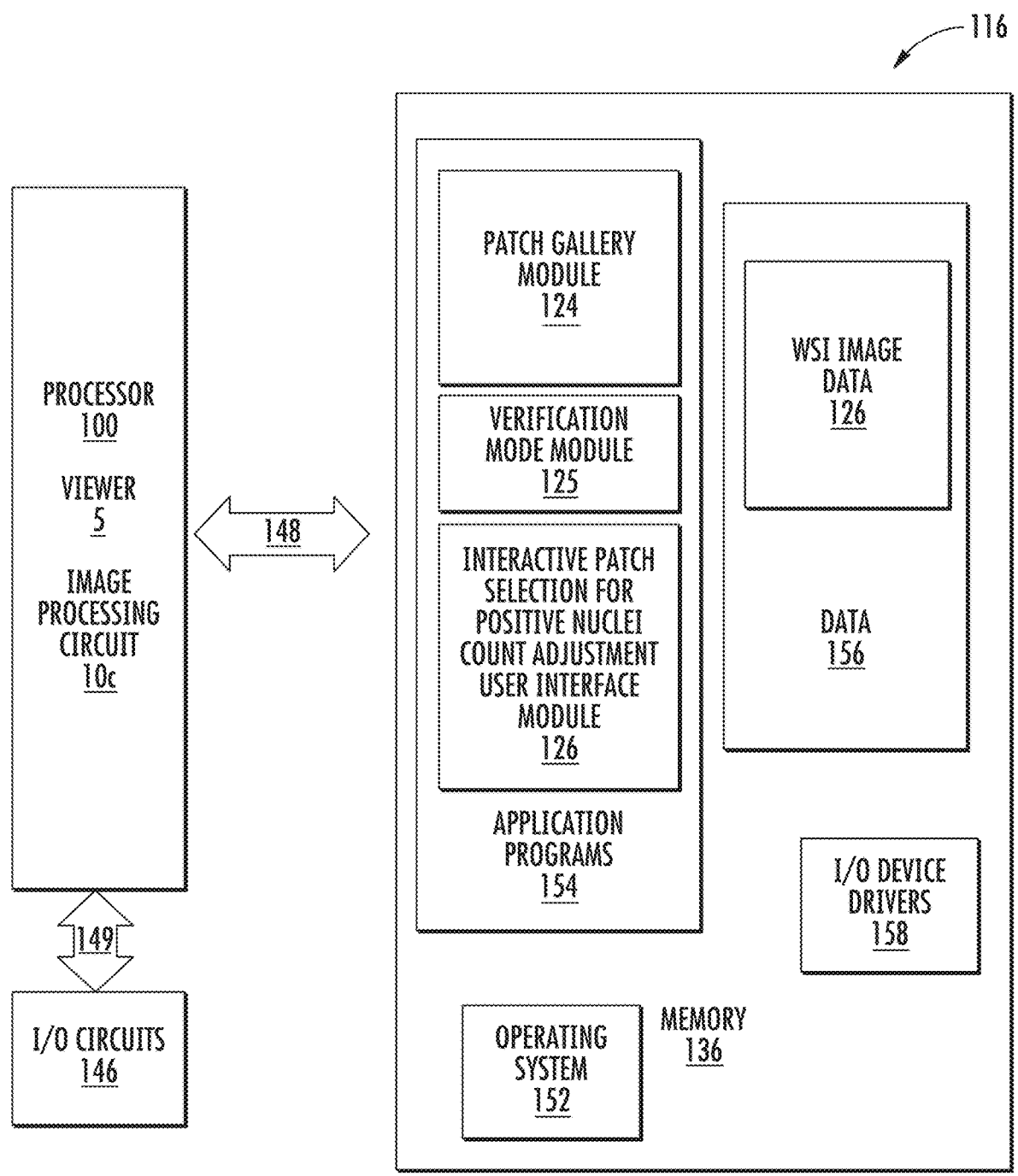
FIG. 14 is a schematic illustration of a data processing circuit according to some embodiments of the present invention.

As illustrated in FIG. 14, embodiments of the invention may be configured as a data processing system 116, which can include a (one or more) processors 100, a memory 136 and input/output circuits 146. The one or more processors 100 can be part of a viewer 5 and/or imaging processing circuit 10c. The data processing system may be incorporated in, for example, one or more of a personal computer, database, workstation W, server, router or the like. The system 116 can reside on one machine or be distributed over a plurality of machines. The processor 100 communicates with the memory 136 via an address/data bus 148 and communicates with the input/output circuits 146 via an address/data bus 149. The input/output circuits 146 can be used to transfer information between the memory (memory and/or storage media) 136 and another computer system or a network using, for example, an Internet protocol (IP) connection. These components may be conventional components such as those used in many conventional data processing systems, which may be configured to operate as described herein.

In particular, the processor 100 can be commercially available or custom microprocessor, microcontroller, digital signal processor or the like. The memory 136 may include any memory devices and/or storage media containing the software and data used to implement the functionality circuits or modules used in accordance with embodiments of the present invention. The memory 136 can include, but is not limited to, the following types of devices: ROM, PROM, EPROM, EEPROM, flash memory, SRAM, DRAM and magnetic disk. In some embodiments of the present invention, the memory 136 may be a content addressable memory (CAM).

As further illustrated in FIG. 14, the memory (and/or storage media) 136 may include several categories of software and data used in the data processing system: an operating system 152; application programs 154; input/output device drivers 158; and data 156. As will be appreciated by those of skill in the art, the operating system 152 may be any operating system suitable for use with a data processing system, such as IBM®, OS/2®, AIX® or zOS® operating systems or Microsoft® Windows®95, Windows98, Windows2000 or WindowsXP operating systems, Unix or Linux™, IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data 156 represents the static and dynamic data used by the application programs 154 the operating system 152 the input/output device drivers 158 and other software programs that may reside in the memory 136.

The data 156 may include (archived or stored) digital image data sets 126 correlated to respective patients. As further illustrated in FIG. 14, according to some embodiments of the present invention, the application programs 154 include a Patch Gallery Module 124. The application programs can also include a Verification Mode Module 125 and/or an Interactive Patch Selection for Positive Nuclei Count Adjustment User Interface Module 126. The application program 154 may be located in a local server (or processor) and/or database or a remote server (or processor) and/or database, or combinations of local and remote databases and/or servers.

While the present invention is illustrated with reference to the application programs 154, and Modules 124, 125 and 126 in FIG. 14, as will be appreciated by those of skill in the art, other configurations fall within the scope of the present invention. For example, rather than being application programs 154 these circuits and modules may also be incorporated into the operating system 152 or other such logical division of the data processing system. Furthermore, while the application programs 124, 125, 126 are illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 14 but may be provided by other arrangements and/or divisions of functions between data processing systems. For example, although FIG. 14 is illustrated as having various circuits and modules, one or more of these circuits or modules may be combined or separated without departing from the scope of the present invention.

Figure 15A:
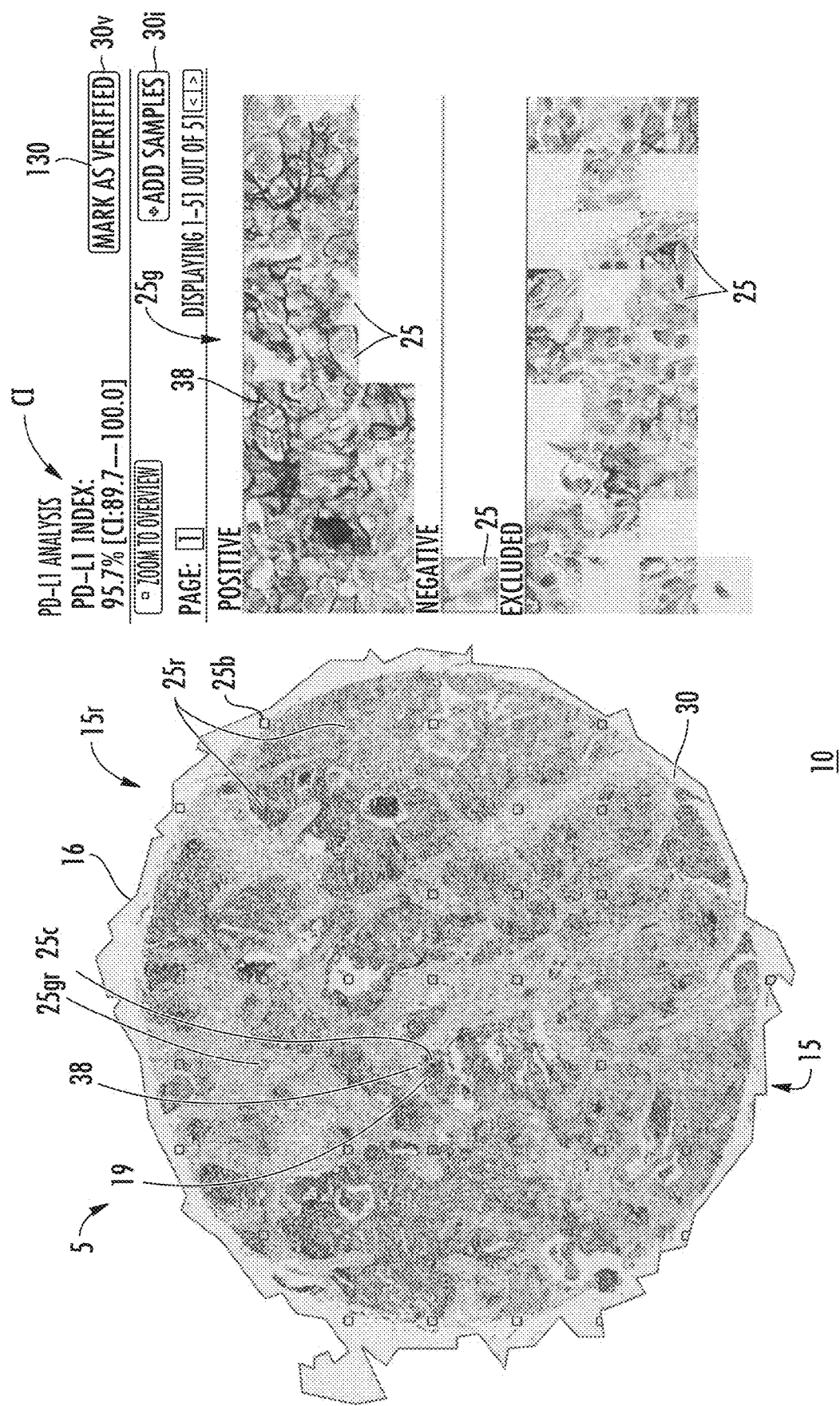
FIG. 15A is an example of a viewer display screen with user-interactive window(s) according to embodiments of the present invention.
Figure 15B:
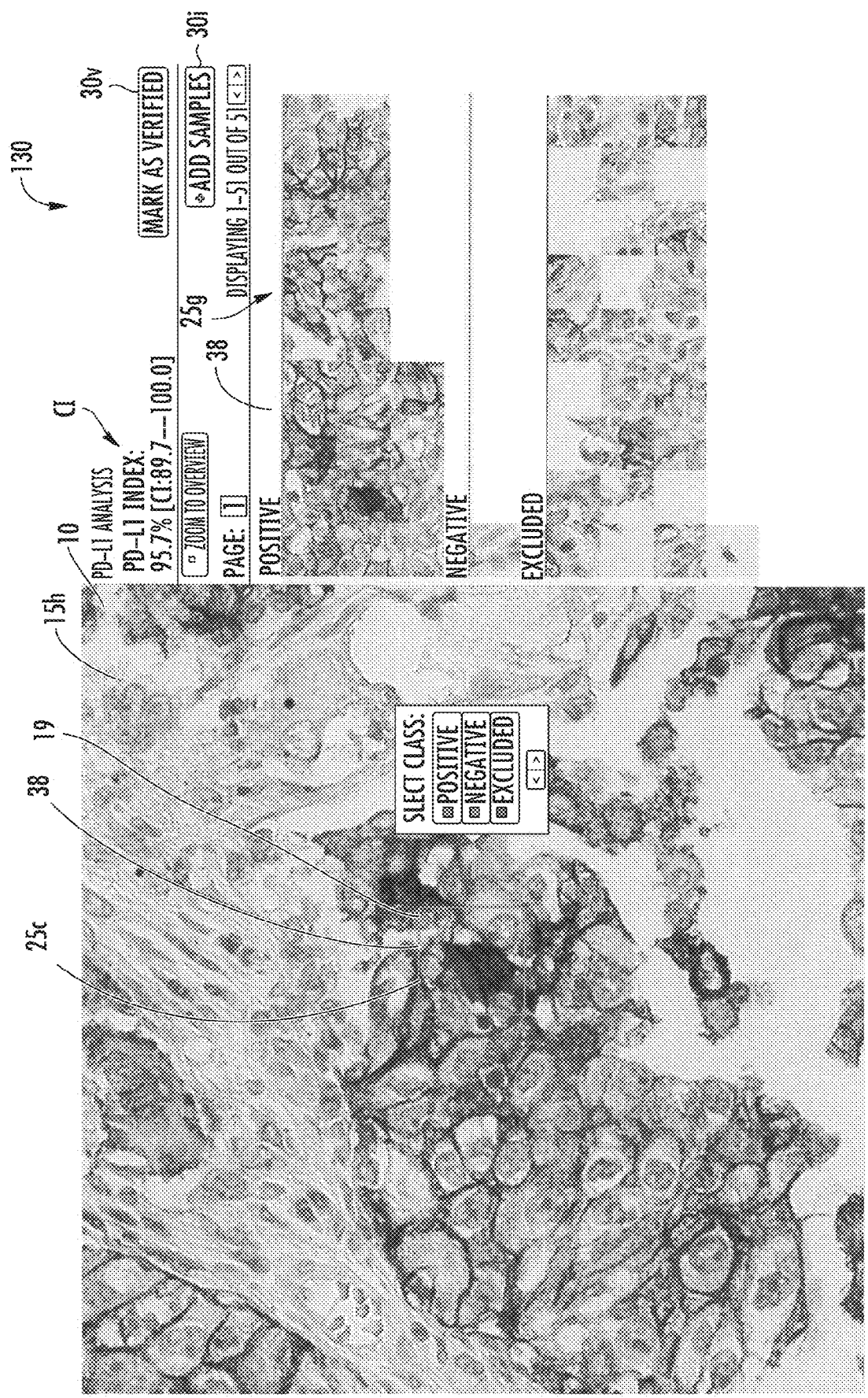
FIG. 15B is an example of a viewer display screen with user-interactive window(s) and a zoomed to location at higher magnification of a patch of interest relative to FIG. 15A according to embodiments of the present invention.

FIG. 15A is an example of a viewer display screen with user-interactive window(s) according to embodiments of the present invention. FIG. 15B is an example of a viewer display screen with user-interactive window(s) and a main view zoomed to location at higher magnification of a patch of interest relative to FIG. 15A according to embodiments of the present invention.

FIG. 15A and FIG. 15B illustrate PDL1 analysis which is a type of immunohistochemistry (IHC) image, most similar to HER2, since it stains the cell membrane instead of the cell nuclei. The implementation is similar to that discussed above with respect to FIG. 6. A machine learning algorithm 66 can be used to divide a plurality of patches 25 into a patch gallery 25g. The patches can be divided into three groups, Positive, Negative and Excluded, similar to the division of nuclei in FIG. 6, which as discussed above is divided into Positive, Negative and Non-tumor. Non-tumor is the same as Excluded. Dividing the patches 25 into three groups is the same as classifying into the three groups and/or nominally sorting the patches along a cell type feature, which is a compound feature 25c as in FIG. 9.

In FIG. 15A, when hovering about a patch 25 (user interface input 38) with the computer mouse or tactile input, a corresponding patch can be visually enhanced 25c, i.e., a perimeter 19 highlighted (the light green square) in the ROI 15r. When the user selects (i.e., touches or clicks) the user interface input 38, a main view 15h can automatically navigate to the location of that patch 25c as in FIG. 15B.

The user can change the classification of a respective patch either by dragging the patch in the patch gallery 25g to a different classification or by pressing the corresponding select "class" input or button of the different classes for the patch in the main view (FIG. 15B) of the user interface 38.

As shown, the viewer 5 has a verification mode 130 with a user input 30v to allow a patch to be marked as "verified". The "add samples" button 30i can perform the same action/ input as the next button 30i in FIG. 6. The display also includes a calculated confidence interval index "CI" for the patches classified as positive (which may be for the entire set or a panel of such patches).

Referring to FIGS. 15A, 15B and 16A-16C, the different classes of patches 25 can be shown in an ROI 15r typically spaced apart in a grid G and in different color perimeters, shown as black 25b, green 25gr and red 25r, depending on a current classification.

The circuit 10c can be configured so that a grid G of patches 25 can get denser by adding in additional patches 25. FIGS. 16A-16C illustrate a grid G of patches 25 that increases from an initial number N of patches 25 in the grid G (FIG. 16A) to arrive at a suitable sample size >N, typically by 25% or more (up to 10×, for example) patches 25 from an initial patch number, for a desired calculated confidence interval (either FIG. 16B or FIG. 16C) according to embodiments of the present invention.

Referring to FIG. 16A, first an initial grid of patches G can be generated based on a given sample size N and the size of the region of interest 15r. The patch gallery 25g can be provided typically using random sorting and/or stratified random sampling. A user and/or the circuit 10c can then add new patchess that can increase, i.e., double, the amount of sample patches by filling in a complementary space of the ROI 15r of the target sample, which creates a new grid G with 2N sample patches as shown in FIG. 16B. The larger grid G can also be optionally rotated from the initial view shown in FIG. 16A, typically about 45 degrees. That is, by populating (filling in) the complementary space in between original patches in the grid, this can be carried out mathematically to be equivalent to rotating the grid 45 degrees and decrease the spacing with 1/sqrt(2) times. This means that the confidence interval can be mathematically derived using the grid method of Gundersen, incorporated by reference as if stated in full hereinabove.

It is then possible to again fill in the complementary space and double the amount of samples to 4N in order to generate a straight grid (FIG. 16C). This process can then be repeated until a sufficient number of sample patches from the original WSI image have been retrieved to generate a desired calculated confidence interval of analysis.

Figure 17:
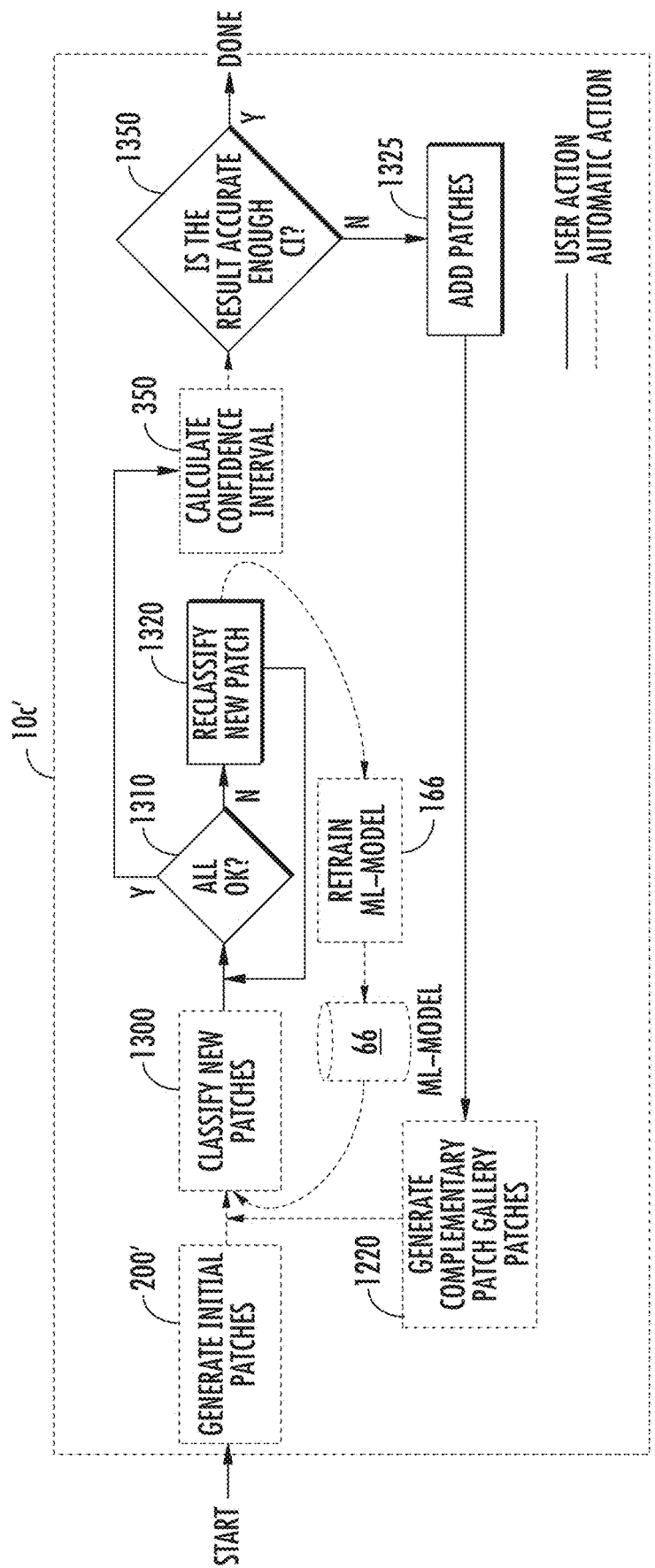
FIG. 17 is a flow chart of actions/operations that can occur to reclassify patches based on user-input and optionally retrains a machine learning model for the classification according to embodiments of the present invention.

FIG. 17 is a flow chart of actions/operations that can occur to reclassify patches 25 based on user-input and can optionally retrain a machine learning model for the classification according to embodiments of the present invention.

FIG. 17 is an example flow chart of a circuit 10c' that illustrates how a classification after user input can be carried out. The circuit and generate an initial classification of a number of different patches (block 200'). A machine learning model and/or algorithm 66 can be used to reclassify original patches and/or classify new patches of the WSI image (block 1300). A user can review the classified patches (at process decision "All ok?" (block 1310) and can modify those patches that are found to be incorrect (block 1320). When a correction takes place, the machine learning algorithm (block 66) can optionally retrain the model (block 166) that is used to classify newly sampled patches (block 1300). In practice, it may be more common, to launch a retraining of the ML-model at a defined threshold of incorrect classifications, such as at each 3 d, 4th, 5th, 6th, 7th, 8th, 9th or $10^{th}$ correction or similar since this process can take a few seconds to process and may otherwise delay or queue up a server hosting the viewer 5. After the user considers a sufficient number (or all) classified patches to be correct, the user can review the calculated confidence interval (CI) to check whether the accuracy is sufficiently high (block 1350). If it is not, new sample patches (block 1325) can be added to the patch gallery 25g and/or grid G based on user input or automatically. These new sample patches can then use the updated model 66 that has been adapted to a specific image. This means that the machine classification of the newly added samples may be better than the initial classification (block 1300). The classification of already corrected samples will not be affected by the new classification made by the ML-model (block 66 as retrained per block 166).

The calculated confidence interval can be calculated separately from the statistics used in the ML-model.

The final ML-model may be used to improve the accuracy of the estimated confidence interval. However, a simplest method can be to add a random offset to a final sampling grid and automatically classify all patches and calculate a percentage, and then reperform this process a plurality of times, such as between about 10-1000 times and estimate the confidence interval CI from the distribution of the observed percentage values.

Table 1 below is provided by way of example to illustrate potential different effects when using a patch gallery according to embodiments of the present invention. Depending on the application, all types of user input will not be required and/or used. The figures in the Figures column are examples of figures that relates to each user-input.

TABLE 1

USER INTERFACE INPUTS

| User input | Example FIGS. | Effect(s) |
|---|---|---|
| Click on patch | 5A, 5B, 6, 15A, 15B | Navigate to the location of the patch in high magnification. |
| Drag patch to new class | 4B, 6, 15A, 15B | 1. Patch gets reclassified<br>2. (optional) ML-model retrained |
| Hover patch | 1, 2, 3, 4A, 4B, 5A, 5B, 6, 15A, 15B | Patch is highlighted in patch view and in ROI. |
| Add samples | 15A, 15B, 16A-16C, 17 | New samples are drawn complementary to existing in the grid.<br>Samples are automatically classified with the (re-)trained ML-model. |
| Next | 6 | If samples have not yet been classified, samples are automatically classified with the (re-) trained model. If the inclusion lines have been modified, then the new patches are classified based on the new cutoff values alongside the feature dimensions. However, new samples are typically not drawn. |
| Select many patches | 4B, 6, 15A, 15B | 1. Patch gets reclassified<br>2. (optional) ML-model retrained |
| Drag many patches | 4B, 6, 15A, 15B | 1. Patch gets reclassified<br>2. (optional) ML-model retrained |
| Reclassify using UI input in ROI | 15B | 1. Patch gets reclassified<br>2. (optional) ML-model retrained |
| Reclassify by clicking on nuclei marker in ROI | 1, 2, 3, 4A, 4B, 5B | 1. Patch gets reclassified<br>2. (optional) ML-model retrained |
| Drag inclusion line | 1, 2, 3, 4A, 4B | 1. Cut-off value for classification along a feature dimension get changed.<br>2. All nuclei with a feature value that has switched side of the new cut-off value changes to a new class. |
| Double click on inclusion line | 1, 2, 3, 4A, 4B | The range of patches on the feature dimension shown is zoom in by a factor X. If the new range on the feature dimension does not contain enough patches in the gallery, the range is extended (by decreasing X) until there is enough patches to display in the gallery. When this point is reached it will no longer be possible to zoom in any more. |
| Remove patch by clicking on cross | 5A | The patch is removed from the sample (or classified a non-nuclei, which is equivalent). |

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed:

1. A method of processing digital pathology and cytology images for viewing, comprising:

electronically generating a plurality of patches of different sub-regions of a region of interest (ROI) from a digital pathology or cytology whole slide image (WSI) image, wherein the patches are, actual region excerpts from the WSI image, and wherein the patches each have a pre-defined and common shape and are distributed and spaced apart from each other across the ROI with a complementary space between the patches; then electronically classifying the patches into a plurality of different classes; then electronically providing samples of the patches from each of the different classes;

electronically adding new patches from the complementary space of the ROI to the patch gallery to improve a calculated confidence interval associated with the patches being correctly classified in the different classes;

presenting a plurality of the provided patches as a patch gallery on a display; and accepting user input to electronically interface with the patch gallery to perform at least one of:
(i) adjust a threshold value of a feature dimension of the patches using an electronic interface input feature on the patch gallery;
(ii) reduce a parameter span/extent from the parameter span/extent shown for the patches in the patch gallery which electronically updates the patch gallery displayed to include a more narrow extent of the parameter span/extent;
(iii) select or exclude at least one of the patches in the patch gallery to automatically reduce a first positive total cell count by removing cell counts associated with positive cells in the selected or excluded patch; and
(iv) select or exclude at least one of the patches in the patch gallery to automatically reclassify the selected patch from its classification in the patch gallery.

2. The method of claim 1, further comprising electronically automatically calculating a compound feature using a defined transformation function of a plurality of different feature dimensions of the patches for the electronic classification and/or sorting.

3. The method of claim 1, wherein the presenting is carried out so that the patches in the patch gallery are shown on the display in no particular order.

4. The method of claim 1, wherein the samples of the patches are provided based on at least one of a positivity probability and a nucleus probability.

5. The method of claim 1, wherein the samples of the patches are provided based on a positivity probability and a nucleus probability and the order is in an ordinal or numeric scale of the probabilities.

6. The method of claim 1, further comprising electronically selecting patches from the generated patches to represent an extent of an ordinal or numeric scale of at least one feature dimension used for the classifying step.

7. The method of claim 1, wherein the electronically providing the samples of the patches is carried out to represent an extent of an ordinal or numeric scale of at least one feature dimension.

8. The method of claim 1, wherein the electronically classifying the patches is carried out to classify the patches as either (i) comprising positive nuclei or cell membrane, (ii) comprising negative nuclei or cell membrane, or (iii) comprising non-nuclei or excluded cell membrane.

9. The method of claim 1, wherein at least one panel of the patch gallery is arranged in a random order from left to right and/or up to down, with decreasing probability values of positivity and/or cell nuclei decreasing to the right and/or down.

10. The method of claim 1, wherein the patch gallery arranges the patches with neighboring patches in the gallery not being neighboring actual region excerpts in the WSI image, and wherein the generated patches represent sub-regions of the ROI.

11. The method of claim 1, wherein the patches in the patch gallery are of regions in the WSI image spanning a defined feature dimension that can be altered by a user interacting with the patch gallery.

12. The method of claim 1, further comprising accepting user input to select a patch of interest in the patch gallery, then automatically electronically navigating a larger main or full image view to center the main or full image view to a position closer to the selected patch.

13. The method of claim 1, further comprising accepting user input to change a color in a patch of the patch gallery which automatically electronically color maps other patches and a main image view of regions corresponding to the updated patches to have the changed color.

14. The method of claim 13, further comprising electronically altering a total positive cell count based on the accepting user input.

15. The method of claim 1, wherein at least one of (iii) or (iv) is carried out by allowing the user to select or move a horizontal and/or vertical line drawn about the patches.

16. The method of claim 1, wherein the sample patches are provided in a random order based on at least one feature dimension in some of the patches, and wherein the method further comprises concurrently displaying a zoomed or normal main digital pathology or cytology image view with the patch gallery, and wherein the patches in the patch gallery are presented in decreasing value from top to bottom and/or left to right on the display.

17. The method of claim 1, wherein the WSI image is a two-dimensional (2-D) WSI image having between about $1 \times 10^6$ pixels to about $1 \times 10^{12}$ pixels.

18. The method of claim 1, wherein the WSI image is a three-dimensional (3-D) WSI image, and wherein a z extent has a plurality of slices across a depth of a tissue section with less pixels in the z extent relative to x and y extents.

19. The method of claim 1, further comprising automatically electronically resorting patches in different classifications based on user input to change the classification of one of the patches from its initial classification, then electronically generating a revised confidence interval of the different classification of the patches calculating an overall percentage and/or confidence interval as the revised confidence interval using statistical confidence intervals of each resorted set of patches.

20. The method of claim 1, further comprising allowing the user to set a cut-off value that controls boundaries for area segmentation in a larger/main view.

21. The method of claim 1, further comprising electronically allowing a user to direct a circuit of a viewer to add the new patches of the complementary space of the region of interest of the WSI to the patch gallery to thereby produce the desired calculated confidence interval of a likelihood, and wherein the calculated confidence interval associated with the patches being correctly classified in the different classes comprises correct identification of positive cell count.

22. The method of claim 1, wherein the accepting user input to electronically interface with the patch gallery to perform at least one of is configured to perform all of (i)-(iv).

23. A method of processing digital pathology and cytology images for viewing, comprising:
electronically generating a plurality of patches of different sub-regions of a region of interest from a digital pathology or cytology whole slide image (WSI) image;
electronically classifying the patches into a plurality of different classes;
electronically providing random samples of the patches from each of the different classes;
presenting a plurality of the provided patches as a patch gallery on a display; and
accepting user input to electronically interface with the patch gallery to perform at least one of:
(i) adjust a threshold value of a feature dimension of the patches using an electronic interface input feature on the patch gallery;
(ii) reduce a parameter span/extent from the parameter span/extent shown for the patches in the patch gallery which electronically updates the patch gallery displayed to include a more narrow extent of the parameter span/extent;
(iii) select or exclude at least one of the patches in the patch gallery to automatically reduce a first positive total cell count by removing cell counts associated with positive cells in the selected or excluded patch; and
(iv) select or exclude at least one of the patches in the patch gallery to automatically reclassify the selected patch from its classification in the patch gallery,
wherein the method further comprises one or more of:
(a) automatically electronically resorting patches in different classifications based on user input to change the classification of one of the patches from its initial classification, then electronically generating a revised confidence interval of the different classification of the patches; and/or
(b) providing an electronic verification mode that allows a user to electronically change a classification of different patches by moving a patch in a patch gallery to another location associated with a different classification; and/or
(c) providing an electronic verification mode that allows a user to electronically change a classification of different patches by selecting a user input in a main view showing a high magnification portion of an associated patch under review in the WSI; and/or
(d) electronically allowing a user to direct a circuit to add new patches of a complementary space of the region of interest of the WSI to increase a statistical confidence interval of a likelihood of correct identification of positive cell count.

24. The method of claim 23, wherein the method includes each of (a)-(d).

25. A viewer for evaluating Whole Slide Images (WSI), comprising:
a display; and
a circuit in communication with the display, the circuit comprising at least one processor that:
generates a plurality of patches of different regions of interest from a digital pathology or cytology whole slide image (WSI), wherein the patches are actual region excerpts from a respective WSI image that are spaced apart and distributed across a region of interest of the respective WSI image and that have a pre-defined height and width dimension with a complementary space between patches; then
classifies the patches into a plurality of different classes; then
provides samples of the patches from the different classes; then
presents a plurality of the patches from each of the different classes as a patch gallery on a display;
accepts user input to electronically interface with the patch gallery; and
adds new patches from the complementary space of the ROI to the patch gallery to improve a calculated confidence interval associated with the patches being correctly classified in the different classes.

26. The viewer of claim 25, wherein the circuit is configured to calculate a compound feature using a defined transformation function of a plurality of different feature dimensions of the patches for classifying the patches and/or providing the patches.

27. The viewer of claim 25, wherein the circuit has a verification mode that resorts patches into a different classification based on user input to change the classification of one of the patches from its initial classification, and generates a revised confidence interval of the different classification of the patches.

28. The viewer of claim 25, wherein the circuit adds the new patches of the complementary space of the region of interest of the WSI to the patch gallery to improve the calculated confidence interval associated with the patches being correctly classified in the different classes to provide a desired calculated confidence interval of a likelihood of correct identification of positive cell count.

29. The viewer of claim 25, wherein the circuit is configured to provide random samples of the patches for the patches of the different classes of samples.

30. A method of processing digital pathology and cytology images for viewing, comprising:
electronically generating a plurality of patches of different sub-regions of a region of interest (ROI) from a digital pathology or cytology whole slide image (WSI) image, wherein the patches are actual region excerpts from the WSI image that are spaced apart across the ROI; then
electronically classifying the patches into a plurality of different classes; then
electronically providing samples of the patches from each of the different classes;
presenting a plurality of the provided patches as a patch gallery on a display;
allowing a user to set a cut-off threshold of a positivity level by selecting a patch, selecting a level between two patches and moving a path to a different side of the cut-off threshold;
electronically adding new patches from a complementary space of the ROI to the patch gallery to improve a calculated confidence interval associated with the classified patches being correctly classified; and
accepting user input to electronically interface with the patch gallery to perform at least one of:
(i) adjust a threshold value of a feature dimension of the patches using an electronic interface input feature on the patch gallery;
(ii) reduce a parameter span/extent from the parameter span/extent shown for the patches in the patch gallery which electronically updates the patch gallery displayed to include a more narrow extent of the parameter span/extent;
(iii) select or exclude at least one of the patches in the patch gallery to automatically reduce a first positive total cell count by removing cell counts associated with positive cells in the selected or excluded patch; and
(iv) select or exclude at least one of the patches in the patch gallery to automatically reclassify the selected patch from its classification in the patch gallery.

31. A method of processing digital pathology and cytology images for viewing, comprising:
electronically generating a plurality of patches of different sub-regions of a region of interest (ROI) from a digital pathology or cytology whole slide image (WSI) image, wherein the patches are actual region excerpts from the WSI image, and wherein the patches are distributed and spaced apart from each other across the ROI with a complementary space between the patches; then
electronically classifying the patches into a plurality of different classes; and then
electronically automatically or by user interaction adding patches from the complementary space of the ROI to improve a calculated confidence interval associated with the patches being correctly classified in the different classes.

32. The method of claim 31, wherein the electronically generating comprises generating a first grid having a first number of spaced apart patches, then generating a second grid having an increased number of spaced apart patches that include patches from the complementary space to increase the calculated confidence interval associated with the patches being correctly classified.

* * * * *

UNITED STATES PATENT AND TRADEMARK OFFICE
CERTIFICATE OF CORRECTION

PATENT NO. : 10,489,633 B2
APPLICATION NO. : 15/711785
DATED : November 26, 2019
INVENTOR(S) : Molin et al.

Page 1 of 1

It is certified that error appears in the above-identified patent and that said Letters Patent is hereby corrected as shown below:

In the Claims

Column 28, Line 31, Claim 19: Please correct "and/or" to read -- and --

Signed and Sealed this
Twenty-fourth Day of March, 2020

Andrei Iancu
*Director of the United States Patent and Trademark Office*